United States Patent
Zhang

(10) Patent No.: US 11,566,835 B2
(45) Date of Patent: *Jan. 31, 2023

(54) BLAST CELL COOLING WITH GUIDED AIRFLOW

(71) Applicant: Lineage Logistics, LLC, Irvine, CA (US)

(72) Inventor: Alexander Ming Zhang, Daly City, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,402

(22) Filed: Feb. 4, 2022

(65) Prior Publication Data

US 2022/0154996 A1    May 19, 2022

Related U.S. Application Data

(63) Continuation of application No. 16/745,232, filed on Jan. 16, 2020, now Pat. No. 11,243,019, which is a continuation of application No. 16/453,834, filed on Jun. 26, 2019, now Pat. No. 10,663,210.

(51) Int. Cl.
*F25D 17/06* (2006.01)
*F25D 17/00* (2006.01)

(52) U.S. Cl.
CPC .......... *F25D 17/06* (2013.01); *F25D 17/005* (2013.01); *F25D 2400/30* (2013.01)

(58) Field of Classification Search
CPC ..... F25D 17/06; F25D 17/005; F25D 2400/30
USPC .......................................................... 62/62
See application file for complete search history.

(56) References Cited

U.S. PATENT DOCUMENTS

| | | | |
|---|---|---|---|
| 5,791,150 A | 8/1998 | Bosher et al. | |
| 5,826,432 A | 10/1998 | Ledbetter | |
| 6,128,911 A | 10/2000 | Mathews | |
| 2004/0194494 A1 | 10/2004 | Wilkinson | |
| 2011/0107784 A1* | 5/2011 | Tippmann | F25D 17/06 62/340 |
| 2015/0250225 A1 | 9/2015 | Hata | |
| 2017/0086485 A1 | 3/2017 | Tippmann | |
| 2018/0320949 A1 | 11/2018 | Tippmann | |
| 2019/0045817 A1 | 2/2019 | Woolf et al. | |

FOREIGN PATENT DOCUMENTS

| | | |
|---|---|---|
| CN | 101284490 | 10/2008 |
| CN | 103747709 | 4/2014 |
| CN | 105698465 | 6/2016 |
| DE | 202009015795 | 2/2010 |
| KR | 20030021876 | 3/2003 |
| WO | WO 2016199487 | 12/2016 |

OTHER PUBLICATIONS

PCT International Search Report in International Application No. PCT/US2020/039930, dated Sep. 21, 2020, 15 pages.
Trippmann Group, https://www.tippmanngroup.com/qfr-zone/, QFR Zone brouchure, 2009.

* cited by examiner

*Primary Examiner* — Steve S Tanenbaum
(74) *Attorney, Agent, or Firm* — Fish & Richardson P.C.

(57) ABSTRACT

A blast cell system is provided with simple and scalable designs that prevent short cycling of air flow through any pallets in blast cells. The blast cell includes a plurality of suction channels that provide independent fluid pathways for directing the air drawn from different rows in the blast cell into the fan.

23 Claims, 14 Drawing Sheets

BLAST CELL COOLING WITH GUIDED AIRFLOW

CROSS REFERENCE TO RELATED APPLICATIONS

This application is a continuation application of U.S. patent application Ser. No. 16/745,232, filed Jan. 16, 2020, which is a continuation application of U.S. patent application Ser. No. 16/453,834, filed Jun. 26, 2019, which is incorporated herein in its entirety.

TECHNICAL FIELD

This specification relates to technology for efficiently cooling physical items in a blast cell.

BACKGROUND

Convective air blast freezing is a process by which freezing of items like foodstuffs is facilitated by flowing very cold air over the items via mechanical force. Such air blast freezing can be typically used for very large volumes of goods that are carried on pallets. Airflow of thousands of cubic feet per minute (CFM) can be used for freezing. Blast freezing is typically used on perishable foods (e.g., fruits and meats) geographically near their point of initial food processing. Such goods may then be stored for a short or long period in frozen warehouse, and then shipped to a point close to their use, such as to a grocery store or a warehouse operated by a particular grocer.

Such food decays largely because it includes water, which when not frozen, is a hospitable environment for bacteria and other pathogens. Blast freezing can prevent this process and thus is employed broadly in the food distribution industry. Blast freezing can be a large and expensive consumer of electricity, natural gas, or other mechanisms needed to operate chillers, fans, and other equipment required to perform such large-scale cooling.

SUMMARY

This document generally describes technology for cooling of items such as perishable foodstuffs. Some embodiments described herein include an item cooling system for blast freezing items. Some examples of the system include a blast cell system having one or more blast cells.

The blast cell system of the present disclosure provides simple and easily scalable designs that prevent short cycling of air flow through any pallets in different levels (e.g., rows) in blast cells. Further, the blast cell system can reduce turbulence in air circulation in the blast cells. In some examples, different levels in a blast cell are provided with separate suction channels configured to direct the flow of air that is pulled from the respective levels to a fan in the blast cell. The suction channels can be designed to provide independent fluid pathways that are in fluid communication with different levels in a bay space of a blast cell, such that air flow that has passed through the respective levels is partitioned and pulled through the independent channels to a fan that operates to draw air from the bay space in the blast cell. The suction channels can form closed-loop circulation of air through different levels in the bay space of the blast cell and provide a vacuum cleaner effect in air circulation in the blast cell.

Some examples of the blast cell of the present disclosure include one or more air flow guides to reduce turbulent air and enhance flow in air circulation in the blast cell. The air flow guides include streamlined structures. In some examples, the air flow guides include turning vanes that are arranged at sharp edges or corners of the blast cell to reduce turbulence thereat and provide efficient air flow. For example, the turning vanes can be arranged at a corner adjacent a cell entry and to be in fluid communication with a plenum that passes the air pushed from the fan. The turning vanes are configured to be curved so that the air passing through the turning vanes are streamlined.

In some examples, the air flow guides include a ramp that is removably arranged between the bay space and the cell entry and provides an air stream surface that improve air flow coming into the bay space with no or little turbulence. The ramp can be installed when the blast cell is closed with a door. The ramp can be removed to allow entry of pallets when the blast cell is at least partially open with the door at least partially removed.

Particular embodiments described herein include an apparatus for cooling items. The apparatus includes a housing, a fan, and a plurality of channels. The housing can define a bay space and include a plurality of rows in the bay space. Each of the plurality of rows is configured to hold one or more pallets of items to be cooled. The fan is arranged away from the bay space and configured to circulate air through the bay space in the housing. The fan is operable to pull the air from a rearward region of the bay space and discharge the air toward an opposite forward region of the bay space. The plurality of channels is arranged between the rearward region of the bay space and the fan. Each of the plurality of channels defines a fluid pathway from a corresponding row of the plurality of rows to the fan and is configured to direct air flow from the rearward region of the bay space to the fan through the fluid pathway.

In some implementations, the system can optionally include one or more of the following features. The plurality of channels can each have a drawing end adjacent the rearward region of the bay space and a discharging end adjacent the fan. The discharging end has a narrower width than the drawing end. The plurality of channels can each has a width that gradually becomes smaller from a drawing end adjacent the rearward region of the bay space to an opposite discharging end adjacent the fan. The plurality of channels can include one or more walls curved between the drawing end and the discharging end.

The apparatus may further include an intake plenum having forward and rearward ends. The forward end is in communication with the forward region of the bay space, and the rearward end is in communication with the rearward region of the bay space. The fan can be arranged to flow air from the rearward end of the intake plenum toward the forward end of the intake plenum. The plurality of section channels is arranged between the rearward region of the bay space and the rearward end of the intake plenum. The intake plenum can be arranged to be spaced apart from the bay space of the housing. The fan can be arranged adjacent the rearward end of the intake plenum.

The apparatus may further include an air flow guide arranged at a corner of the housing and configured to streamline the air flow at the corner with reduced turbulence. The air flow guide can include a plurality of turning vanes configured to provide curved air passages at the corner. The air flow guide can include a ramp removably arranged between the forward region of the bay space and an entrance of the housing. The ramp is configured to provide a surface along which the air flows.

The apparatus may further include a door configured to selectively open or close an entrance of the housing through which the items are moved into the bay space. The entrance can be arranged closer to the forward region of the bay space than the rearward region of the bay space.

The plurality of section channels can be arranged at different levels separated by at least one shelf in the bay space. The apparatus can be configured as a blast freezer. The fan can be a reversible fan configured to direct air in either of opposite directions in the housing.

The apparatus may further include a booster fan configured to direct air in a direction opposite to a direction of air circulated by the fan.

Particular embodiments described herein include a method for cooling items. The method comprising providing a plurality of rows in a bay space of a housing, each row configured to hold items to be cooled; supplying the air from an evaporator with a fan through an intake plenum, the intake plenum configured to direct the air toward a forward region of the bay space; and drawing, with the fan, the air from an rearward region of the bay space through fluid pathways defined by a plurality of channels, the plurality of channels arranged between the rearward region of the bay space and the fan and being in fluid communication with the plurality of rows, respectively.

In some implementations, the system can optionally include one or more of the following features. The plurality of channels can each have a drawing end adjacent the rearward region of the bay space and a discharging end adjacent the fan. The discharging end has a narrower width than the drawing end. The plurality of channels can each have a width that gradually becomes smaller from a drawing end adjacent the rearward region of the bay space to an opposite discharging end adjacent the fan. The plurality of channels can include one or more walls curved between the drawing end and the discharging end.

The method may further include directing the air through an air flow guide before or after the bay space. The air flow guide can include a plurality of turning vanes configured to provide curved air passages at a corner in the housing.

Particular embodiments described herein include an apparatus for cooling items. The apparatus includes a plurality of cells arranged side-by-side. Each cell can include a housing, an intake plenum, a fan, and a plurality of section channels. The housing defines a bay space and includes a plurality of bay sections in the bay space. Each of the plurality of bay sections is configured to hold items to be cooled. The intake plenum can be arranged at a top side of the housing above the bay space. The intake plenum has forward and rearward ends. The forward end is in communication with a forward region of the bay space, and the rearward end is in communication with a rearward region of the bay space. The fan can be arranged at the top side of the housing and adjacent the rearward end of the intake plenum. The fan is configured to circulate air through the bay space in the housing. The fan is operable to pull the air from the rearward region of the bay space and supply the air through the intake plenum toward the forward region of the bay space. The plurality of section channels can be arranged between the rearward region of the bay space and the rearward end of the intake plenum. The plurality of section channels can be in fluid communication with the plurality of bay sections, respectively, and configured to direct air flow from the rearward region of the bay space to the rearward end of the intake plenum.

In some implementations, the system can optionally include one or more of the following features. The apparatus may further include an evaporator configured to cool the air upstream the fan.

The implementations described herein can provide one or more of the following advantages. First, some embodiments described herein include a blast cell system the provides cooling at lower cost, higher speed, or with greater uniformity of temperature as compared to a blast cell that does not have the suction channels and/or the air flow guides. For example, the suction channels in the blast cell allow air to be drawn uniformly through different levels in a blast cell. The suction channels are configured to define fluid pathways for individual levels in a blast cell and provide separate air flow through each level of the blast cell. Therefore, the air flow through one of the levels has no or little influence on the air flow through the other levels. Further, the air flow drawing through the suction channels can create a vacuum effect that promotes effective air flow through all the pellets in respective levels in the blast cell, regardless of how much each level is filled with pallets of items.

Second, some embodiments described herein include a blast cell system that reduces turbulence in air circulation in a blast cell, thereby improving efficiency in cooling the pellets of items. For example, the air flow guides, such as the return vanes and the ramp, are structured to streamline the air flow and reduce turbulence that would otherwise be created at particular regions in the blast cell, such as the corners and entrance of the blast cell.

Third, some embodiments described herein include a blast cell system that is easily scalable and flexible in different applications. For example, the suction channels and the air flow guides of the blast cell system are simple structures that can be easily implemented in different sizes and numbers. Further, the suction channels and the air flow guides neither require additional electric devices or elements, nor involve complex manual operation or automation.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Described below are various implementations of methods and systems for cooling (e.g., blast freezing) items such as perishable foodstuffs that have previously been packed as groups of items onto shipping and storage pallets. The systems and techniques discussed herein provide simple and easily scalable blast cells that prevent short cycling of air flow through the items in blast cells. Each blast cell can include a plurality of suction channels that provide independent fluid pathways for directing the air drawn from different rows in the blast cell into the fan.

Figure 1:
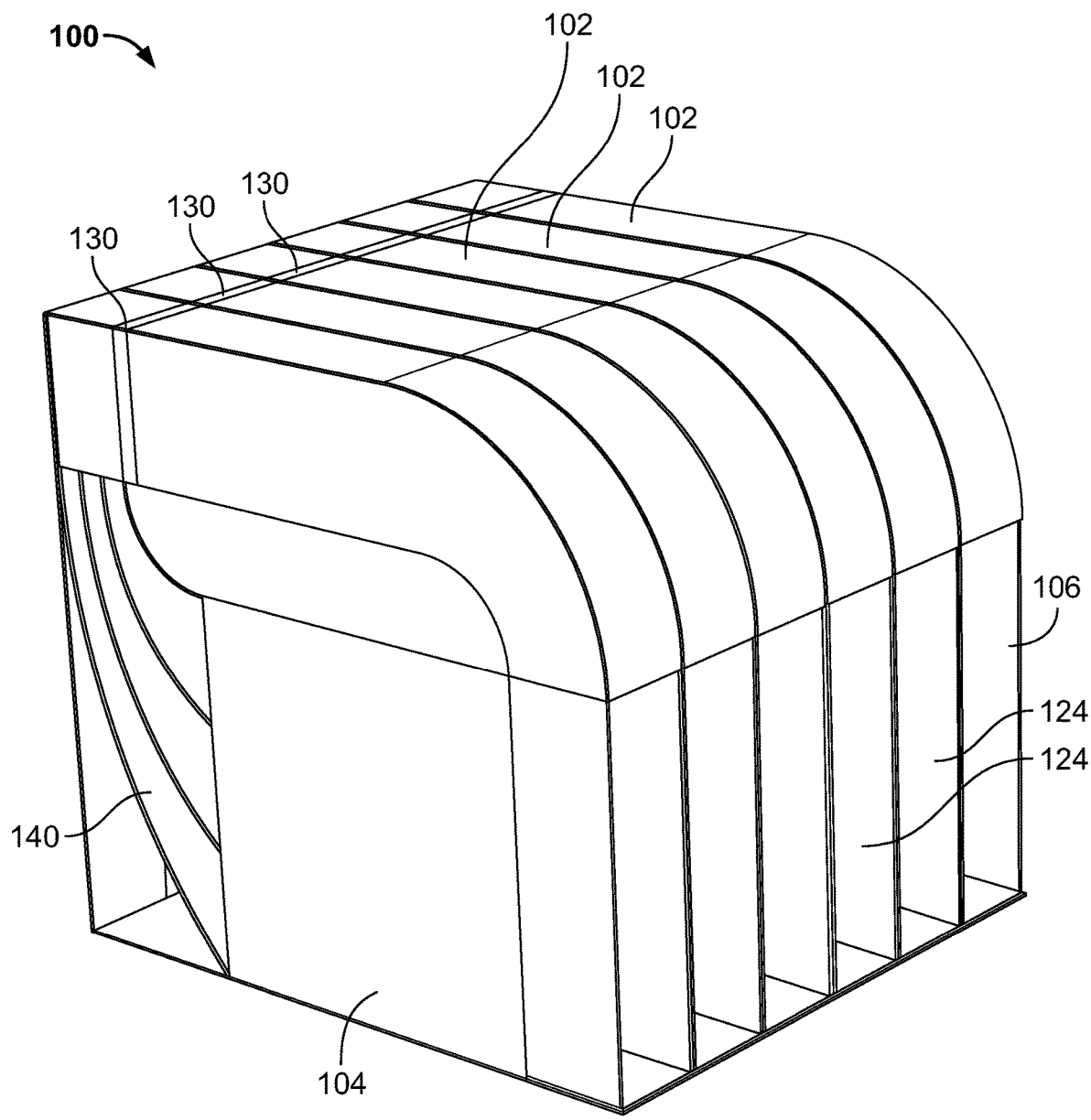
FIG. 1 is a perspective view of an example blast cell system.

Referring to FIG. 1, an example blast cell system 100 is configured to cool items loaded therein. Although the blast cell system 100 is primarily described herein as a freezer, it is understood that the blast cell system 100 can be used as a chiller with or without modification. The blast cell system 100 can include one or more blast cells 102, each configured to receive items and operate to cool the items loaded therein. In the illustrated example, the blast cells 102 are arranged side-by-side. In other examples, at least one of the blast cells 102 is arranged at a distance from an adjacent blast cell 102. Other configurations are also possible.

In this example, the blast cell system 100 can be tens of feet wide and high, such as, for example, 10-100 feet wide and 10-50 feet high. The blast cell system 100 can be located inside a storage building, such as in a typical warehouse, and can rest on a concrete or similar floor.

In some embodiments, the blast cells 102 are separated from each other and structured as a standalone apparatus. For example, the blast cells 102 are modularized so that the blast cells 102 are structurally identical or similar to each other. A desired number of blast cells 102 can be installed together, such as side-by-side as illustrated in FIG. 1, to provide the blast cell system 100. In other examples, the blast cell system 100 has a single space between opposite side walls 104, 106 which is partitioned by one or more middle walls to create multiple blast cells 102.

In some embodiments, the blast cells 102 are operated simultaneously under the same operational scheme. In other embodiments, at least one of the blast cells 102 is operable individually. For example, some blast cells 102 can be operated under different operational schemes from the other blast cells 102.

Figure 2:
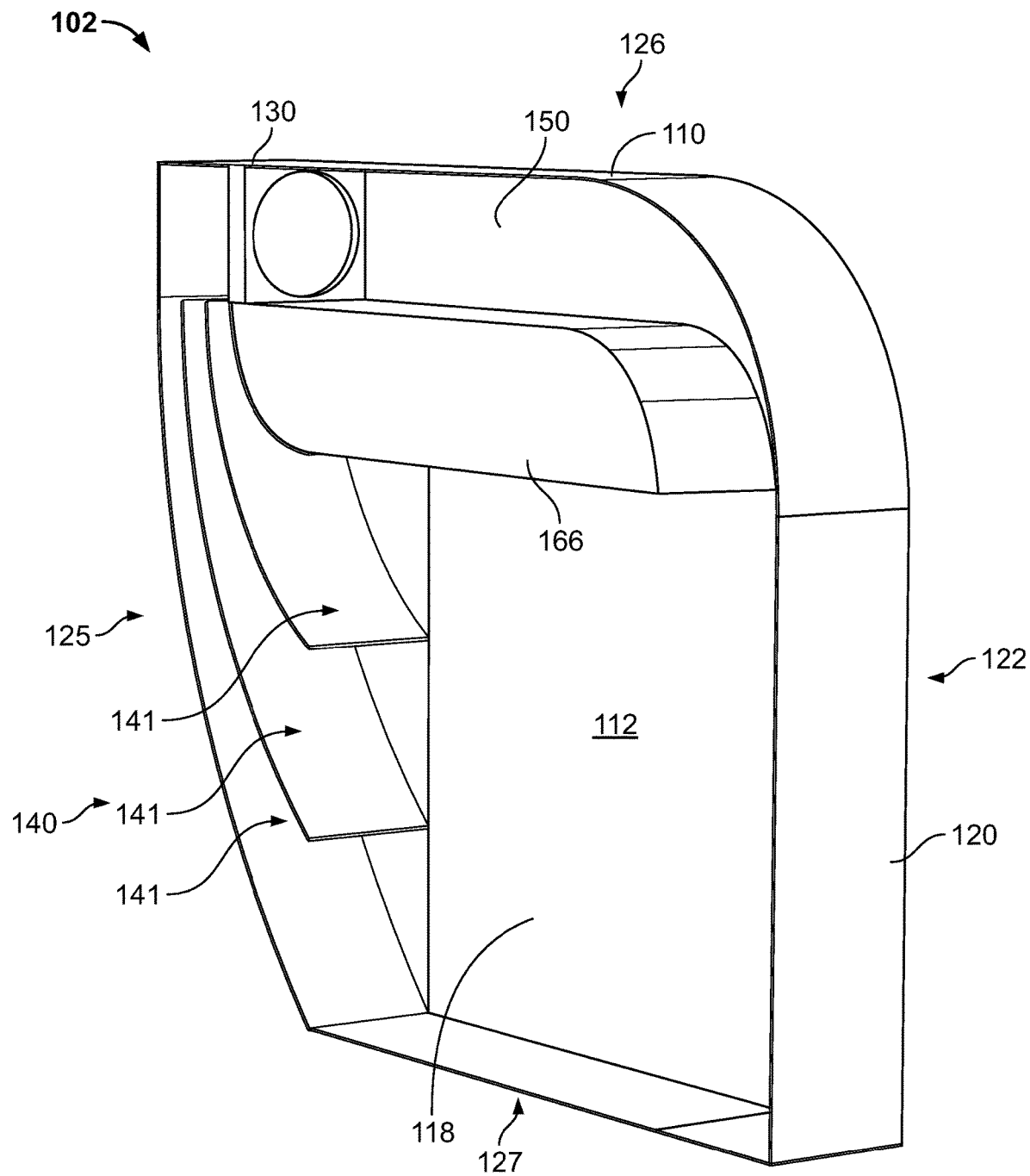
FIG. 2 is a side perspective view of an example blast cell with one of opposite side walls removed.
Figure 3:
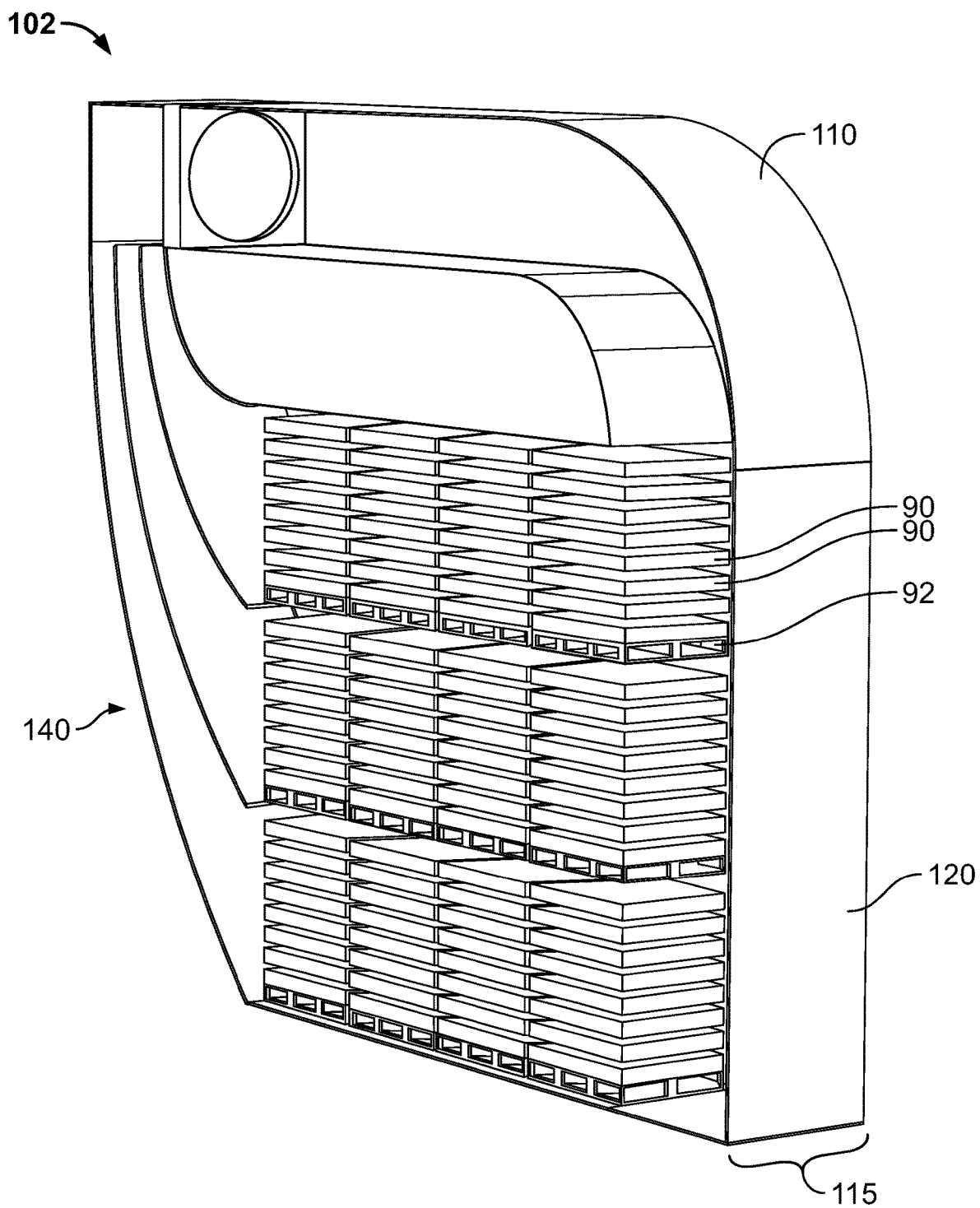
FIG. 3 is a cross-sectional perspective view of the blast cell of FIG. 2 with pallets loaded.
Figure 4:
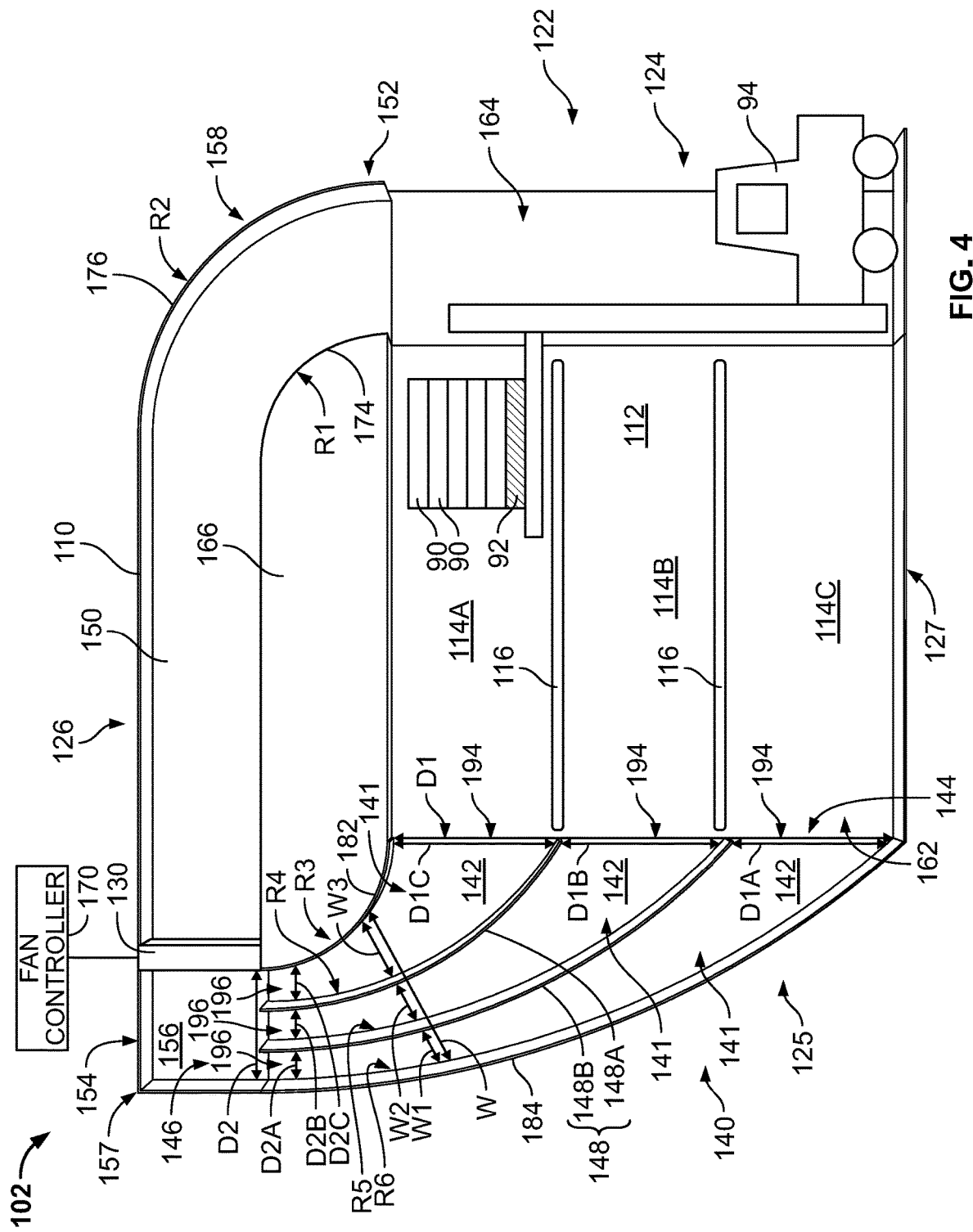
FIG. 4 is a side cross-sectional view of the blast cell of FIG. 2.

Referring to FIGS. 2-4, an example of the blast cell 102 is further described. The blast cell 102 can include a housing 110, a door 120, a fan 130, an air suction channel assembly 140, and an intake plenum 150.

The housing 110 has a front side 122, a rear side 125 opposite to the front side 122, a top side 126, and an opposite bottom side 127. The front side 122 can provide an opening for entrance through which items 90 are carried for loading or unloading. As described herein, the entrance can be selectively closed or opened with the door 120. The blast cell 102 can be installed for operation with the bottom side 127 of the housing 110 placed on the ground or other structure.

The housing 110 includes opposite side walls 118 that generally extend between the front and rear sides 122 and 125 and between the top and bottom sides 126 and 127. In some embodiments, the blast cell 102 is configured to have a narrower width between the side walls 118 of the housing 110 than a distance (e.g., a depth) between the front and rear sides 122 and 125 or a distance (e.g., a height) between the top and bottom sides 126 and 127. Such a narrower width can improve circulation of air that generally flows in parallel with the surfaces of the side walls 118 by limiting air flow in non-parallel directions, e.g., directions at angles (e.g., perpendicular) to the surfaces of the side walls 118.

The housing 110 defines a bay space 112 in which items 90 are loaded for cooling. As illustrated in FIG. 3, in some embodiments, the items 90 can be stacked on pallets 92, and the pallets 92 are carried and held in the bay space 112 so that the items 90 can be cooled in the blast cell 102. The items 90, such as boxes or packages, can be stacked in multiple rows on each pallet 92, and the items 90 in adjacent rows can be spaced apart by a separator to provide a room to allow air flow between the adjacent rows of items.

In some embodiments, as illustrated in FIG. 4, the housing 110 of the blast cell 102 is configured to provide a plurality of levels 114 in the bay space 112. In the illustrated example, the plurality of levels 114 are arranged to form different rows in the bay space 112. In other embodiments, the plurality of levels 114 can be arranged in different orientations to form, for example, different columns or different sections defined by multiple rows and columns.

In the illustrated example, the housing 110 includes three levels (e.g. rows) 114A, 114B, and 114C (collectively 114). Each level 114 is configured to hold the items 90 thereon. The blast cell 102 can provide one or more structures 116 that separate the levels 114 and hold the items 90 on the respective levels 114. For example, the structures 116 can include one or more shelves on which the items 90 and/or pallets 92 are placed. Other configurations of the structures 116 are also possible, such as flanges extending from at least one of the opposite side walls 118 of the blast cell 102.

In some embodiments, the blast cell 102 is configured to open for loading of items into the bay space 112. For example, the blast cell 102 includes the door 120 that is arranged at the front side 122 of the housing 110. The door 120 is configured to at least partially open the front side 122 of the housing 110 to provide an entrance 124 to the bay space 112. The door 120 can be of various types. For example, the door 120 can be configured to swing out, swing up, roll up, or slide to side to open up the entrance 124. When the door 120 is placed, the door 120 encloses the bay space 112 for cooling the items 90 loaded herein.

The door 120 is schematically illustrated as covering the front side 122 of the housing 110 in FIGS. 2 and 3, and removed to open the front side 122 in FIG. 4. When the door 120 is at least partially removed to provide the entrance 124, the items 90 can be loaded at one or more of the levels 114. In some embodiments, a vehicle 94, such as a forklift, can enter the bay space 112 through the entrance 124 to place or remove pallets 92 of items.

The blast cell 102 further includes the fan 130 configured to circulate air through the bay space 112. In some embodiments, the fan 130 can operate to pull the air from a rearward region 162 of the bay space 112. The fan 130 can further operate to discharge the air toward a forward region 164 of the bay space 112 opposite to the rearward region 162.

In some embodiments, the fan 130 is arranged away from the bay space 112. The fan 130 is arranged to be spaced apart from the bay space 112 and not abutted with the part (e.g., a boundary wall) of the housing that defines the bay space 112. For example, the fan 130 can be arranged adjacent or within the intake plenum 150 that is positioned at an upper side of the housing 110.

The blast cell 102 can include a spacing structure 166 arranged between the intake plenum 150 and the bay space 112. The spacing structure 166 provides spacing between the intake plenum 150 and the bay space 112 so that the intake plenum 150 is not abutted with the boundary wall of the bay space 112. The spacing structure 166 can provide an additional room for the suction channel assembly 140 to increase the length of its extension from the bay space 112 toward the fan 130. Such an extended length of the suction channel assembly 140 between the bay space 112 and the fan 130 allows providing streamlined curvatures in air passages and removing sharp edges or curves throughout the suction channel assembly 140 that would cause air to turn abruptly. The spacing structure 166 can be at least partially hollow in some embodiments. Other embodiments of the spacing structure 166 can be configured as a solid body, or a hollow body filled with elements or materials.

In this example, the fan 130 is located at the rear-top of the housing 110 of the blast cell 102. In other implementations, the fan 130 can be located in other positions, such as at the bottom of the blast cell 102 or at one or both sides of the blast cell 102. In other embodiments, each blast cell 102 can include multiple fans, such as one at the top of the blast cell 102 and one at the bottom thereof.

The fan 130 can take a variety of appropriate forms, including propeller fans, axial fans, and centrifugal fans. The fan 130 can be sized to provide the required volume of air across expected pressure drops for the overall circulation through the blast cell 102 when it is loaded partially and fully.

In the blast cell system 100, a plurality of fans 130 can be arrayed horizontally adjacent to each other across the top rear corner of an array of the blast cells 102, as illustrated in FIG. 1. The fans 130 can be independently operated to meet different needs in different blast cells 102. For example, particular ones of the fans 130 can be turned off when no air circulation is needed in particular blast cells 102.

Cooling coils (e.g., evaporators) (not shown) can be placed in the blast cell 102 or adjacent to it. For example, the cooling coils can be placed against the upstream or downstream faces of the fan 130, or can be placed in the intake plenum 150 or another plenum or area where the air circulates so as to receive warmed air and provide cooled air. In other embodiments, the cooling coils can be placed out of the main air circulation for the blast cell 102, such as on the roof of a building, and a single bank of cooling coils can serve multiple blast cells. In such an instance, a pair of taps can be made into the intake plenum 150 or another part of the air circulation of the blast cell 102, where one tap can draw air out of the blast cell 102, and the other can return the cooled air into the blast cell 102, so that it can blend in with the main airflow of the blast cell 102.

The fan 130 can be connected to a fan controller 170, as illustrated in FIG. 4. The fan controller 170 controls the operation of the fan 130. In some embodiments, the fan controller 170 includes a variable-frequency drive that varies the fan speeds as the need for different volumes of air circulation changes. Other drive systems can be used in the fan controller 170 in other embodiments.

Referring still to FIGS. 2-4, the blast cell 102 includes the suction channel assembly 140 that has a plurality of channels 141. The channels 141 are arranged between the rearward region 162 of the bay space 112 and the fan 130. Each of the channels 141 defines a fluid pathway 142 from a level 114 in the bay space 112 toward the fan 130. The channel 141 is configured to direct air flow from the rearward region 162 of the bay space 112 toward the fan 130 through the fluid pathway 142.

In some embodiments, a plurality of channels 141 are provided for respective levels 142 in the bay space 112. In other embodiments, the blast cell 102 includes more or less channels 141 than the number of levels 142 in the bay space 112. In yet other embodiments, the blast cell 102 can include a single channel 140 where the blast cell 102 has a single level 114 in the bay space 112. In yet other embodiments, the blast cell 102 can include a single channel 140 for a plurality of levels 114 in the bay space 112.

The suction channel assembly 140 extends between a drawing end 144 and a discharging end 146. The drawing end 144 is open at the rearward region 162 of the bay space 112 and in fluid communication with the bay space 112. The discharging end 146 is open at the rearward end 154 of the intake plenum 150 and in fluid communication with the intake plenum 150 (e.g., the air inlet portion 156 thereof).

In some embodiments, the suction channel assembly 140 is arranged at the rear side 125 of the housing 110. The channels 141 of the suction channel assembly 140 can be arranged between the rearward region 162 of the bay space 112 and the rearward end 154 of the intake plenum 150, and provide air pathways 142 between the rearward region 162 of the bay space 112 and the rearward end 154 of the intake plenum 150.

The plurality of channels 141 of the suction channel assembly 140 can be formed by providing one or more channel walls 148 in the suction channel assembly 140. The suction channel assembly 140 is configured to be curved from the drawing end 144 and the discharging end 146 to provide streamlined air flow from the drawing end 144 to the discharging end 146. In some embodiments, inner and outer walls 182 and 184 of the suction channel assembly 140 are curved outwardly (toward the rear side 125 of the housing 110), and the channel walls 148 are similarly curved outwardly (toward the rear side 125 of the housing 110). Other configurations for the walls are also possible.

In some embodiments, the suction channel assembly 140 is shaped to be narrower at the discharging end 146 (close to the fan 130) than the drawing end 144 (close to the bay space 112) to create a funnel effect (under Bernoulli's principle), thereby increasing suction power at the discharging end 146 close to the fan 130. In other words, the drawing end 144 is configured to be larger in dimension than the discharging end 146. For example, the drawing end 144 has a neck width D1 larger than a neck width D2 of the discharging end 146. The width W of the suction channel assembly 140 can gradually become smaller from the neck width D1 of the drawing end 144 to the neck width D2 of the discharging end 146.

The neck width D1 of the drawing end 144 can be sized to accommodate at least a part of the height of the bay space 112. The neck width D2 of the discharging end 146 can be sized to be fluidly connected to the air inlet portion 156 of the intake plenum 150 before the fan 130. The neck width D1 can range between about 100 inches and about 500 inches in some embodiments, or between about 200 inches and about 300 inches in other embodiments. In yet other embodiments, the neck width D1 can be about 240 inches. Other sizes of the neck width D1 are also possible. The neck width D2 can range between about 20 inches and about 200 inches in some embodiments, or between about 30 inches and about 100 inches. In yet other embodiments, the neck width D2 can be about 48 inches. Other sizes of the neck width D2 are also possible.

Similarly, a drawing end 194 of each channel 141 is configured to be larger in dimension than a discharging end 196 of that channel 141. For example, the drawing end 194 of each channel 141 has a neck width D1A, D1B, or D1C larger than a neck width D2A, D2B, or D2C of the discharging end 146 of that channel 141. The neck width D1A, D1B, or D1C of the drawing end 144 of each channel 141 can be sized to accommodate at least part of the height of each level 114A, 114B, or 114C of the bay space 112. The neck width D2A, D2B, or D2C of the discharging end 146 of each channel 141 can be sized to be fluidly connected to the air inlet portion 156 of the intake plenum 150 before the fan 130. The width W1, W2, or W2 of each channel 141 can gradually become smaller from the neck width D1A, D1B, or D1C of the drawing end 144 to the neck width D2A, D2B, or D2C of the discharging end 146.

In some embodiments, the neck widths D1A, D1B, and D1C of the drawing ends 194 of the channels 141 are identical. In other embodiments, at least one of the neck widths D1A, D1B, and D1C of the drawing ends 194 of the channels 141 is different from the other neck width(s). In some embodiments, the neck widths D2A, D2B, and D2C of the discharging ends 196 of the channels 141 are identical. In other embodiments, at least one of the neck widths D2A, D2B, and D2C of the discharging ends 196 of the channels 141 is different from the other neck width(s).

The neck width D1A, D1B, or D1C each can range between about 30 inches and about 200 inches in some embodiments, or between about 70 inches and 100 inches in other embodiments. In yet other embodiments, the neck width D1A, D1B, or D1C can be around 80 inches respectively. Other sizes of the neck width D1A, D1B, or D1C are also possible. The neck widths D2A, D2B, and D2C each can range between about 5 inches and about 80 inches in some embodiments, or between about 8 inches and 40 inches in other embodiments. In yet other embodiments, the neck width D2A, D2B, and D2C can be around 16 inches respectively. Other sizes of the neck width D2A, D2B, and D2C are also possible.

In embodiments where the neck width D1 of the drawing end 144 is larger than the neck width D2 of the discharging end 146, curvatures of the walls 182, 148, and 184 become gradually larger in an outward direction (toward the rear side 125 of the housing). For example, the outer wall 184 has a curvature larger than an adjacent channel wall 148 and the inner wall 182, and a channel wall 148 located closer to the outer wall 184 has a curvature larger than the adjacent channel wall 148. The radius of curvature R3 of the inner wall 182 can range between about 20 inches and about 200 inches in some embodiments, and can be about 81 inches in other embodiments. The radius of curvature R4 of the first channel wall 148A can range between about 25 inches and about 300 inches in some embodiments, and can be about 184 inches in other embodiments. The radius of curvature R5 of the second channel wall 148B can range between about 30 inches and about 400 inches in some embodiments, and can be about 318 inches in other embodiments. The radius of curvature R6 of the outer wall 184 can range between about 35 inches and about 500 inches in some embodiments, and can be about 471 inches in other embodiments.

The smaller size of the neck width D2 of the discharging end 146 (or the neck widths D2A, D2B, and D2C of the discharging ends 196) than the neck width D1 of the drawing end 144 (or the neck widths D1A, D1B, and D1C of the drawing ends 194) increases a vacuum cleaner effect at the back of the fan 130 and effectively draws air from each level 114 of the bay space 112.

Referring still to FIGS. 2-4, in some embodiments, the blast cell 102 includes the intake plenum 150. The intake plenum 150 provides a conduit for air flow between the rearward region 162 and the forward region 164 of the bay space 112. The intake plenum 150 has a forward end 152 and a rearward end 154. The forward end 152 can be in fluid communication with the forward region 164 of the bay space 112, and the rearward end 154 can be in fluid communication with the rearward region 162 of the bay space 112. In some embodiments, the intake plenum 150 is arranged at the top side 126 of the housing 110 and extends across the bay space 112. In other embodiments, the intake plenum 150 can be arranged in different locations, such as at the bottom side 127 of the housing while extending across the bay space 112.

The intake plenum 150 can be arranged to be spaced apart from the bay space 112. For example, the intake plenum 150 is arranged at a distance from the bay space 112 with the spacing structure 166 between the intake plenum 150 and the bay space 112. In some embodiments, the spacing structure 166 is configured to provide spacing between the intake plenum 150 and the bay space 112 to allow the channels 141 to gradually extend from the bay space 112 and the fan 130, thereby creating streamlined air flow passage without abrupt turns into the fan 130.

The fan 130 can be arranged relative to the intake plenum 150 to create air flow from the rearward end 154 of the intake plenum 150 toward the forward end 152 of the intake plenum 150. In some embodiments, the fan 130 is arranged adjacent the rearward end 154 of the intake plenum 150. For example, the fan 130 is arranged in the passage of the intake plenum 150 close to the rearward end 154 that is in fluid communication with the plurality of channels 141. In embodiments where the plurality of channels 141 is arranged between the rearward region 162 of the bay space 112 and the rearward end 154 of the intake plenum 150, the fan 130 operates to draw air from the rearward region 162 of the bay space 112 into the rearward end 154 of the intake plenum 150 through the fluid pathways 142 defined by the channels 141. In other embodiments, the fan 130 can be arranged in different locations within the intake plenum 150.

The intake plenum 150 can have an air inlet portion 156 to which air is drawn into the intake plenum 150 at the rearward end 154. In some embodiments, the air inlet portion 156 is formed at a corner 157 where the rear side 125 of the housing 110 and the top side 126 of the housing 110 meet. The air inlet portion 156 is fluidly connected to a discharging end 146 of the suction channel assembly 140. In some embodiments, the channel walls 148 of the suction channel assembly 140 do not extend into the air inlet portion 156 as illustrated in FIG. 4. In these embodiments, the air drawn from the discharging end 146 of the suction channel assembly 140 turns at the corner 157 and flow into the fan 130, as depicted as arrow 270 in FIG. 6. In other embodiments, the channel walls 148 of the suction channel assembly 140 can extend into the air inlet portion 156 to guide air flow between the suction channel assembly 140 and the fan 130 at the corner. In yet other embodiments, the channel walls 148 of the suction channel assembly 140 can extend into the air inlet portion 156 and up to, or close to, the inlet of the fan 130 to further guide the air flow at the corner.

The intake plenum 150 can have an air outlet portion 158 to which air is discharged from the intake plenum 150 at the forward end 152. In some embodiments, the air outlet portion 158 is formed at a corner where the front side 122 of the housing 110 and the top side 126 of the housing 110 meet. The air outlet portion 158 is fluidly connected to the forward region 164 of the bay space 112. The air outlet portion 158 is configured to direct air passing through the intake plenum 150 into the forward region 164 of the bay space 112. In some embodiments, the air outlet portion 158 is configured to provide a curved conduit 172 with opposite inner and outer curved walls 174 and 176 to turn air flow at the corner. As described herein, the air outlet portion 158 can include an air flow guide 250 configured to streamline air flow at the corner and reduce turbulence.

Figure 5:
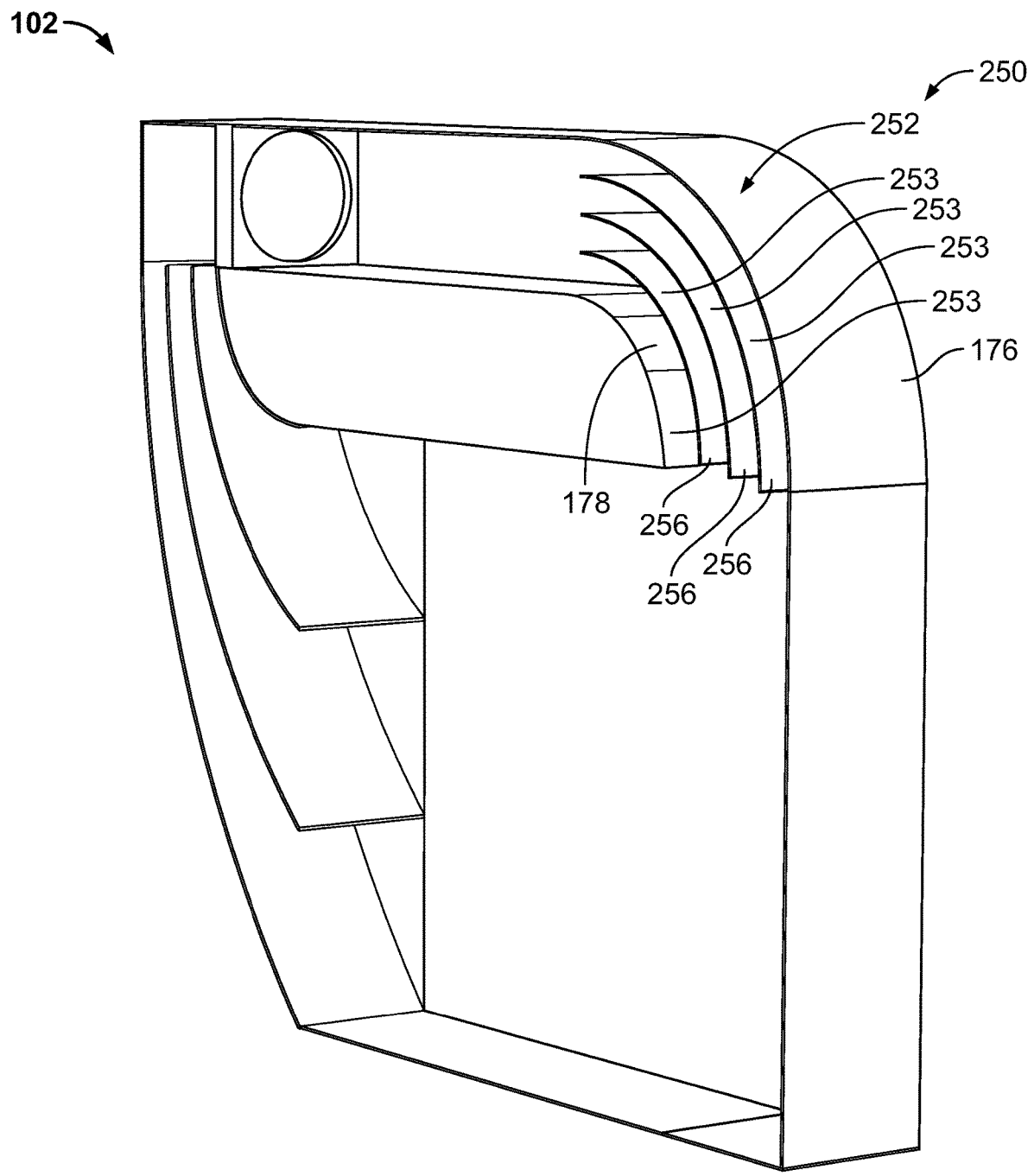
FIG. 5 is a side perspective view of another example blast cell with an example air flow guide.
Figure 6:
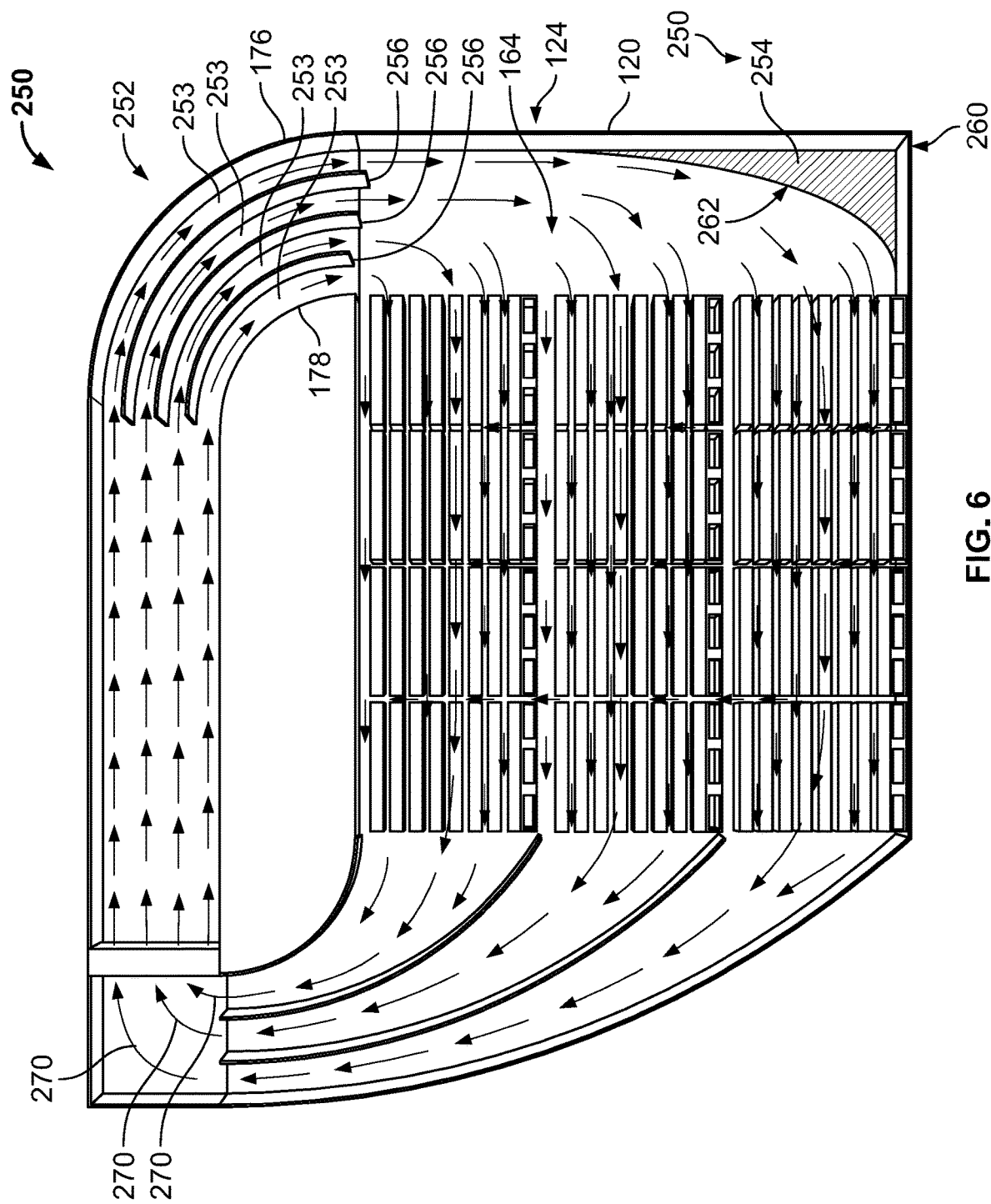
FIG. 6 is a side cross-sectional view of yet another example blast cell with an example air flow guide.

Referring now to FIGS. 5 and 6, in some embodiments, the blast cell 102 includes an air flow guide 250 configured to reduce turbulent air and enhance air circulation in the blast cell 102. The air flow guide 250 can be arranged at one or more corners or sharp portions in the housing 110 and configured to streamline air flow and reduce turbulence thereat. Examples of the air flow guide 250 include a turning vane assembly 252 (FIGS. 5 and 6) and a ramp 254 (FIG. 6).

As illustrated in FIGS. 5 and 6, the turning vane assembly 252 is configured to provide one or more curved air passages at a corner in the housing 110. In some embodiments, the turning vane assembly 252 is provided at the air outlet portion 158 of the intake plenum 150 and configured to guide air flow discharging from the intake plenum 150.

The turning vane assembly 252 can include a plurality of turning vanes 253 that define curved air passages. The turning vanes 253 can be defined by one or more curved vane walls 256 arranged between the inner and outer curved walls 276 of the air outlet portion 158 of the intake plenum 150. In some embodiments, the vane walls 256 are spaced apart equally so that the turning vanes 253 have the same width along the lengths of the turning vanes 253. In other embodiments, at least one of the vane walls 256 is spaced apart at a different distance. In some embodiments, the curved walls 276 and the inner and outer curved walls 174 and 176 are curved at the same curvature. In other embodiments, at least one of the curved walls 276 and the inner and outer curved walls 174 and 176 is curved at a different curvature from the other walls. The radius of curvature R1 of the inner curved wall 174 can range between about 30 inches and about 200 inches in some embodiments, and can be about 80 inches in other embodiments. The radius of curvature R2 of the outer curved wall 176 can range between about 80 inches and about 300 inches in some embodiments, and can be about 130 inches in other embodiments. The radius of curvature of the curved walls 276 can be selected to be suitable between the radii of curvature R1 and R2 of the inner and outer curved walls 174 and 176.

As illustrated in FIG. 6, the ramp 254 is configured to provide a surface along which air flows efficiently. In some embodiments, the ramp 254 is provided at a lower corner 260 in the forward region 164 of the bay space 112. For example, the ramp 252 is arranged between the forward region 164 of the bay space 112 and the entrance 124 of the housing 110. As the lower corner 260 is positioned close to the entrance 124 of the housing 110, the lower corner 260 forms typically a sharp angle (e.g., a right angle) which can create turbulence in air circulation. The ramp 252 provides a streamlined surface 262 that promotes efficient air flow at the lower corner 260. In some embodiments, the surface 262 of the ramp 252 can be curved inwardly (e.g., concave) as illustrated in FIG. 6. In other embodiments, the surface 262 can be straight or curved outwardly (e.g., convex).

In some embodiments, the ramp 254 can be removably placed at the lower corner 260. For example, the ramp 254 is placed at the lower corner 260 when the entrance 124 is closed with the door 120. The ramp 254 is removed from the lower corner 260 to open the entrance 124 so that the items 90 can be freely carried through the entrance 124 by, e.g., the forklift 94 (FIG. 4).

Although not depicted, the air flow guide 250 can be provided to other locations in the blast cell 102 to reduce turbulence in air circulation. For example, the turning vanes 253, the ramp 254, and/or other similar features can be provided at a corner in the air inlet portion 156 of the intake plenum 150 to guide air flow turning from the outlet of the suction channel assembly 140 into the fan 130.

Figure 7:
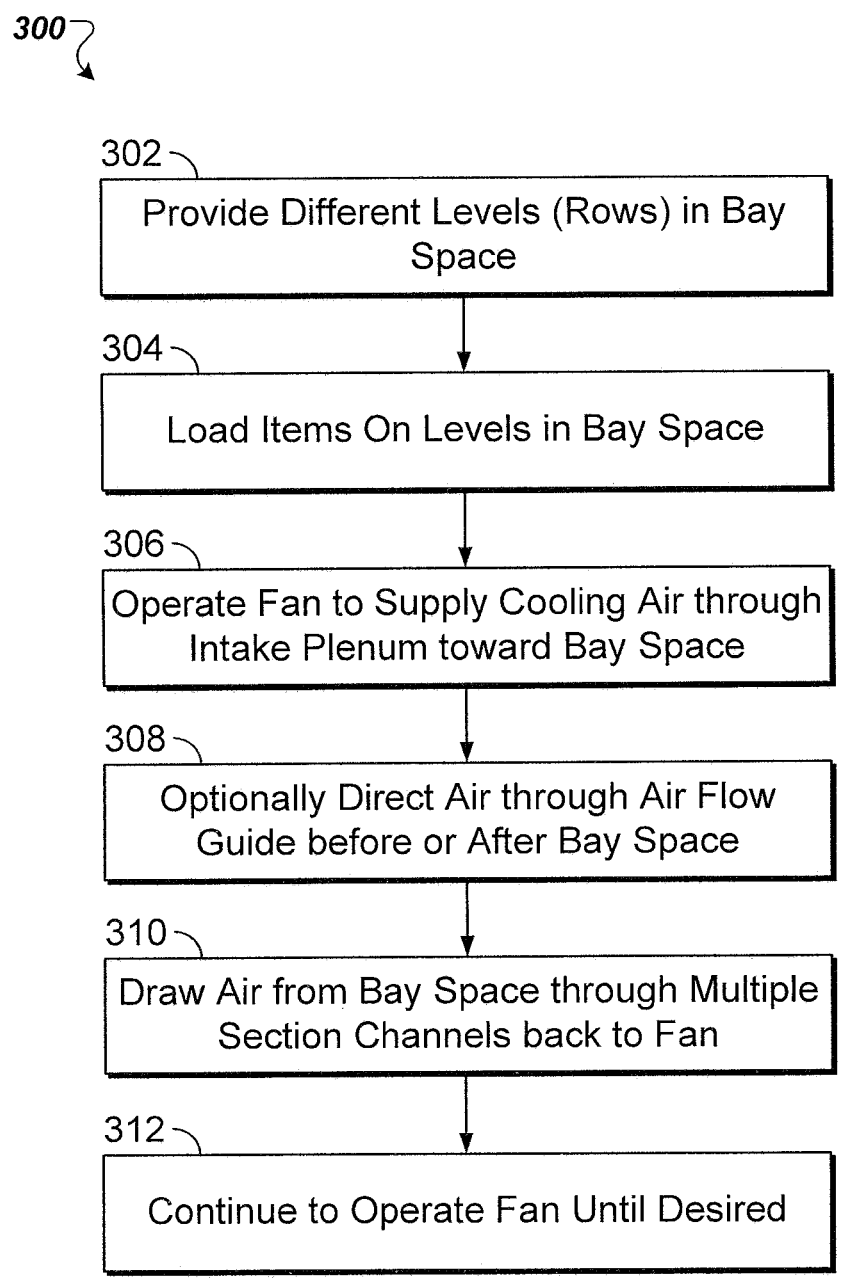
FIG. 7 is a flowchart of an example method for operating the blast cell system.

Referring now to FIG. 7, an example method 300 for cooling items using the blast cell system 100 is described. In general, the method 300 involves circulating air through the items held in the bay space 112 of the housing 110 in efficient and effective ways. For example, the air can be circulated by drawing the air from the bay space 112 to the fan 130 through the suction channel assembly 140. The suction channel assembly 140 includes a plurality of channels 141 configured to create a vacuum cleaner effect at the back of the fan 130 and prevent short cycling of air circulation through any of the items held on different levels in the blast cell 102.

The method 300 can begin at operation 302 in which a blast cell 102 is provided with a plurality of levels (e.g., rows) 114 in a bay space 112 of the blast cell 102. The levels 114 can be formed by one or more various structures, such as shelves, flanges, and other devices configured to support items from the ground.

At operation 304, the blast cell 102 is loaded with items 90. In some embodiments, items 90 are loaded with one or more pallets 92. The items 90 can be of various kinds, such as meats or vegetables, which are to be cooled (e.g., frozen or chilled) for storage or shipping. The pallets of items can be brought into place and dropped by forklifts 94 or other mechanisms. The loading can occur as a complete batch, whereby the entire cell is turned off and then opened for loading and unloading. Alternatively, it can be on a partial-batch basis, whereby a part of the bay space (e.g., a row of the bay space) is opened for loading and unloading, while the air circulates in the blast cell.

At operation 306, air circulation starts in the blast cell 102 by operating the fan 130 to supply cooling air. In some embodiments, the cooling air is delivered through the intake plenum 150 toward the bay space 112 where the items 90 are held in one or more of the different levels 114.

At operation 308, the air flow guide 250, such as the turning vane assembly 252 and/or the ramp 254, is optionally used to direct the air before it reaches the bay space 112 or after it has passed through the bay space 112. For example, the turning vane assembly 252 is arranged at a corner in the blast cell 102 and can include a plurality of turning vanes 253 defining curved air passages at the corner in the blast cell 102. The ramp 254 is arranged at a corner in the blast cell 102 and provides a streamlined surface along which air flows without turbulence.

At operation 310, the air is drawn from the bay space 112 through the suction channel assembly 140 and delivered back to the fan 130. The suction channel assembly 140 includes a plurality of channels 141, each of which has the width that gradually becomes narrower from the drawing end 194 to the discharging end 196, thereby creating a funnel effect to improve air drawing from the bay space 112.

At operation 312, the fan 130 continues to be operated until desired. The fan 130 operates to cool the items 90 to a predetermined temperature and maintain at or around such a temperature until unloaded.

Figure 8:
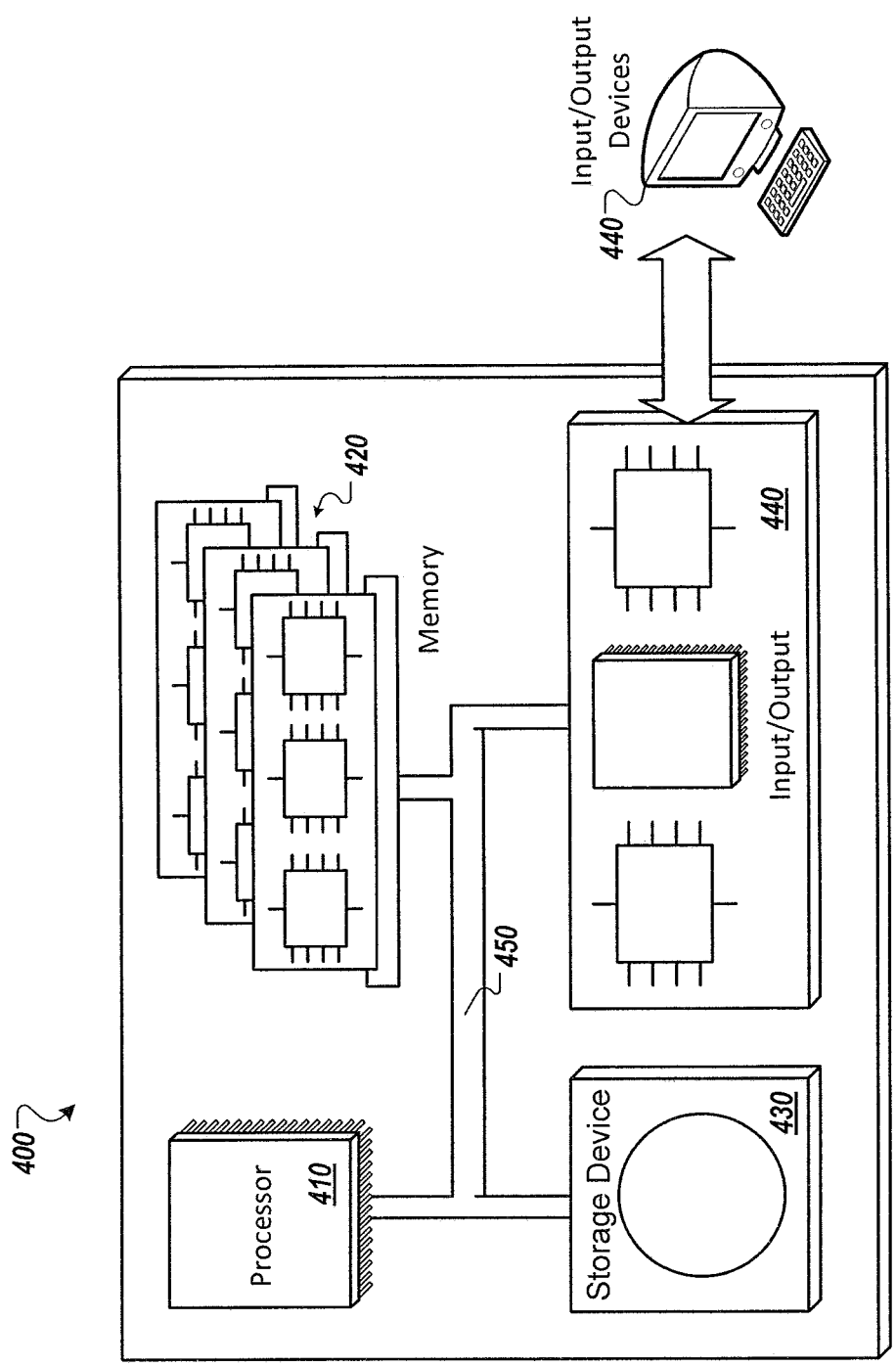
FIG. 8 is a block diagram of an example computing device which can be used to implement the systems and methods described herein.

FIG. 8 is a block diagram of an example computing device 400 which can be used to implement the systems and methods described in this document, as either a client or as a server or plurality of servers. For example, at least some of the elements in the computing device 400 can be used to implement the fan controller 170 as described herein.

Computing device 400 includes a processor 410, memory 420, a storage device 430, and an input/output device 440. Each of the components 410, 420, 430, and 440 are interconnected using a system bus 450. The processor 410 can process instructions for execution within the computing device 400, including instructions stored in the memory 420 or on the storage device 430. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the computing device 400. In one implementation, the memory 420 is a computer-readable medium. In one implementation, the memory 420 is at least one volatile memory unit. In another implementation, the memory 420 is at least one non-volatile memory unit.

The storage device 430 is capable of providing mass storage for the computing device 400. In one implementation, the storage device 430 is a computer-readable medium. In various different implementations, the storage device 430 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Figure 9:
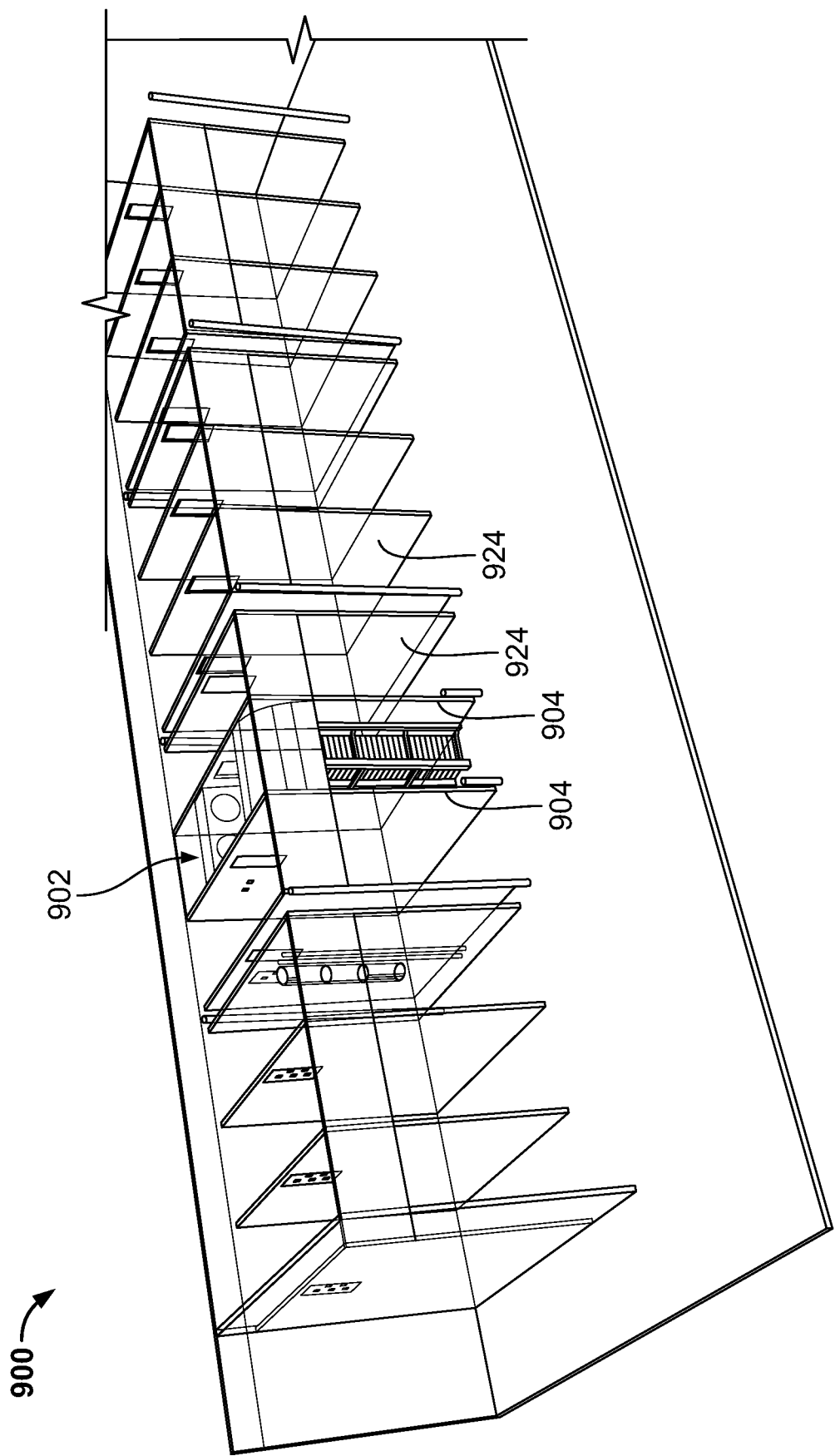
FIG. 9 is a perspective view of an example blast cell system.
Figure 10:
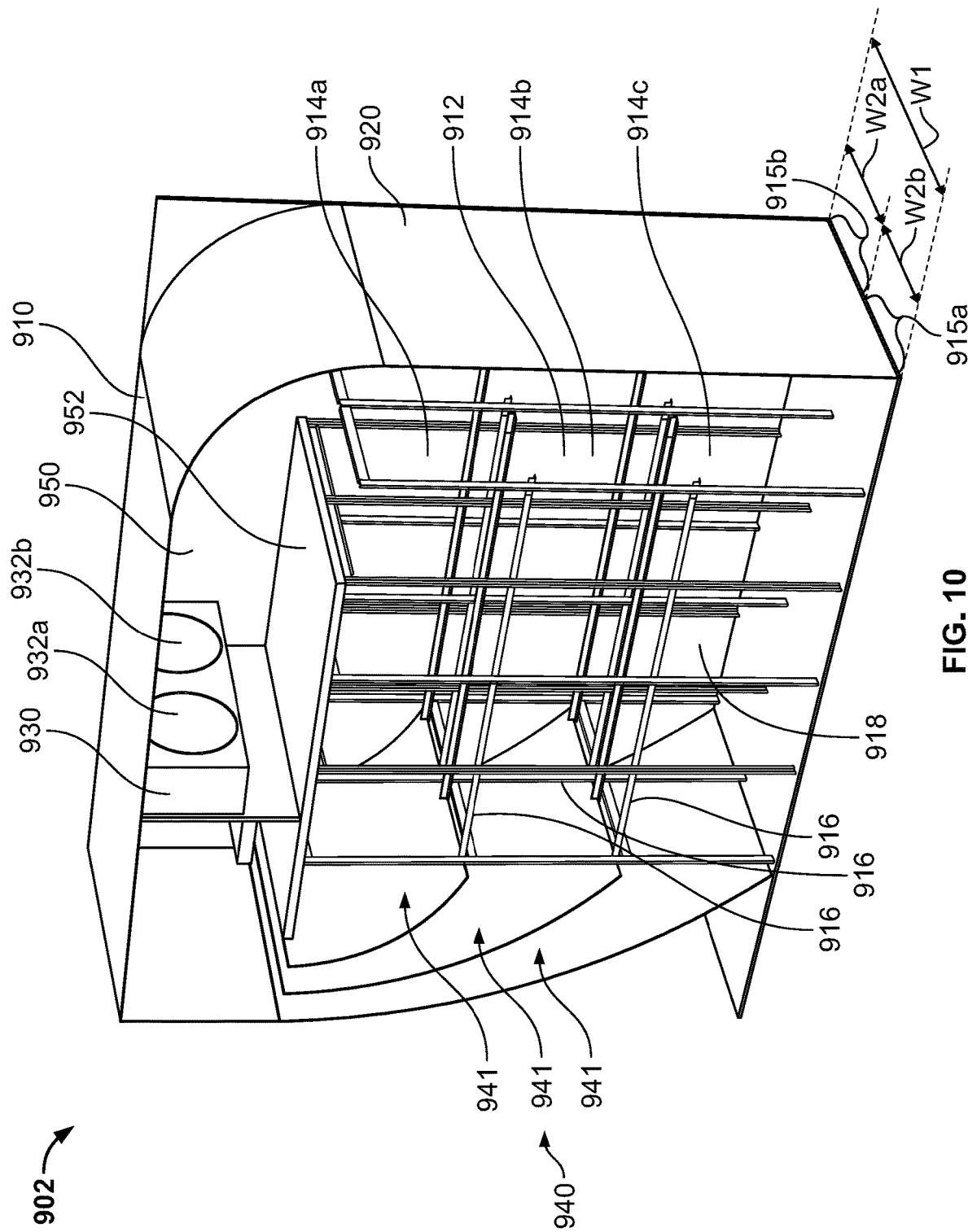
FIG. 10 is a side perspective view of an example blast cell with one of opposite side walls removed.
Figure 11:
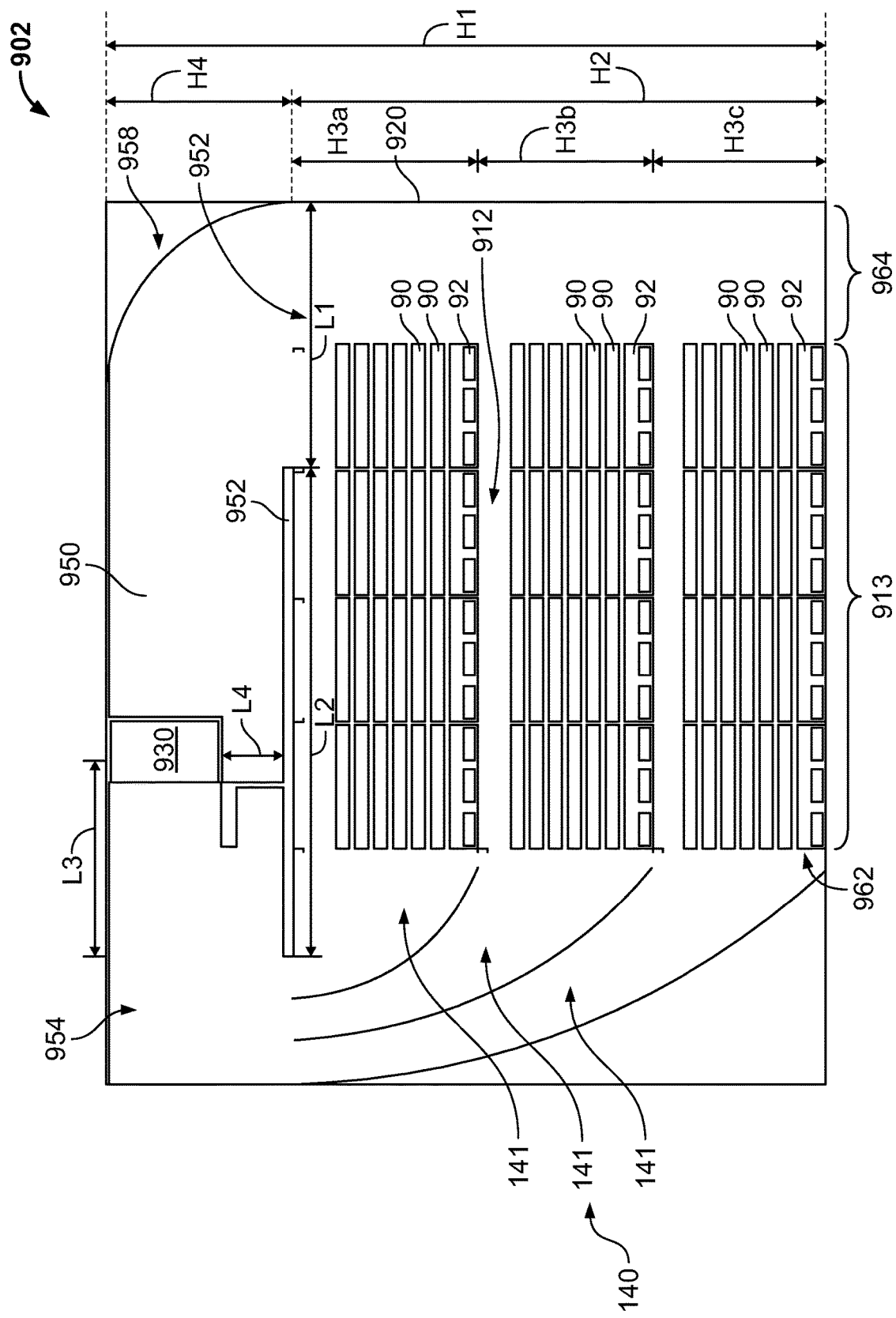
FIG. 11 is a side cross-sectional view of the blast cell of FIG. 10.

Referring now to FIGS. 9-11, an example blast cell system 900 is described. As illustrated in FIG. 9, the blast cell system 900 can be configured similarly to the blast cell system 100. The blast cell system 900 includes one or more blast cells 902, each configured to receive items and operate to cool the items loaded therein. In the illustrated example, the blast cells 902 are arranged side-by-side and split by walls 904. For example, similarly to the blast cells 102, the blast cells 902 can be set up by installing a desired number of blast cells 902 together, such as side-by-side as illustrated in FIG. 9, to provide the blast cell system 900. In other examples, at least one of the blast cells 102 is arranged at a distance from an adjacent blast cell 102, or in other suitable configurations.

The blast cell 902 can be configured similarly to the blast cell 102. As illustrated in FIGS. 10 and 11, an example of the blast cell 902 includes a housing 910, a door 920 (to open or close an entrance 924 in FIG. 9), a fan assembly 930, an air suction channel assembly 940, and an intake plenum 950, which are similar to the housing 110, the door 120, the fan 130, the air suction channel assembly 940, and the intake plenum 150 of the blast cell 102.

The blast cell 902 defines a bay space 912 in the housing 910. The bay space 912 includes an item storage area 913 in which one or more levels 914 are provided, and a forward region 964 configured to permit for air to pass through before the air flows into the item storage area 913. In the illustrated example, the housing 910 includes three levels (e.g., rows) 914A, 914B, and 914C (collectively 914). The blast cell 902 can provide one or more structures 916 that separate the levels 914 and hold the items 90 on the respective levels 914. For example, the structures 916 can include one or more frames arranged and configured to provide shelves on which the items 90 and/or pallets 92 are placed. In addition or alternatively, other configurations of the structures 116 can be provided, such as flanges for engaging or supporting the items 90 and/or pallets 92.

In this example, unlike the blast cell 102, the blast cell 902 does not include a spacing structure (e.g., the spacing structure 166 of the blast cell 102) between the intake plenum 950 and a bay space 912 of the housing 910. Instead, the intake plenum 950 and the bay space 912 is split at least partially by a channel wall 952 therebetween. Without a spacing structure, the blast cell 902 can be made in a smaller height than the blast cell 102.

The intake plenum 950 of the blast cell 902 has a forward end 952 that is in fluid communication with the forward region 964 of the bay space 912. The intake plenum 950 can also be configured to have the forward end 952 being directly open to at least a portion of the item storage area 913. For example, the forward end 952 of the intake plenum 950 has an opening having a length L1 that extends over the forward region 964 and a portion of the item storage area 913 (e.g., a portion of the top level 914A of the plurality of levels 914) of the bay space 912. In other words, the channel wall 952 that divides the intake plenum 950 and the bay space 912 has a shortened length L2 so that the opening of the forward end 952 of the intake plenum 950 is effectively large enough to expose the intake plenum 950 over a portion of the item storage area 913 (e.g., the top level 914A) of the bay space 912. The larger opening of the forward end 952 of the intake plenum 950 (or the shorter channel wall 952 of the intake plenum 950) can allow air to turn from the intake plenum 950 into the item storage area 913 early and smoothly (e.g., with a larger turning radius), thereby increasing effectiveness of air circulation.

The fan assembly 930 can be arranged relative to the intake plenum 950 to create air flow from a rearward end 954 of the intake plenum 950 toward the forward end 952 of the intake plenum 950. In some embodiments, the fan assembly 930 is arranged adjacent the rearward end 954 of the intake plenum 950. For example, the fan assembly 930 is arranged in the passage of the intake plenum 950 close to the rearward end 954 that is in fluid communication with the plurality of channels 941. In embodiments where the plurality of channels 941 is arranged between a rearward region 962 of the bay space 912 and the rearward end 954 of the intake plenum 950, the fan assembly 930 operates to draw air from the rearward region 962 of the bay space 912 into the rearward end 954 of the intake plenum 950 through fluid pathways 942 defined by the channels 941. The fan assembly 930 can be arranged at a distance L3 from an end of the channel wall 952 near the rearward end 954 of the intake plenum 950. The distance L3 of the fan assembly 930 can range from 0 (zero) to about half of the length L2 of the channel wall 952.

The blast cell 102, 902 can be configured to have one bay section or multiple bay sections 915, each section 915 having a single level or multiple levels (e.g., rows) as described herein. For example, as illustrated in FIG. 3, the blast cell 102 has a single bay section 115. Alternatively, as illustrated in FIG. 10, the blast call 902 has double bay sections 915A and 915B arranged side-by-side and open to each other, and each of the bay sections 915A and 915B has three levels 914A, 914B, and 914C. The blast cell 902 can have multiple fans 932A and 932B in the fan assembly 930, which are aligned with the multiple bay sections 915, respectively. In other implementations, the blast cell 902 can have multiple fans in the fan assembly for a single bay section. With multiple bay sections 915, the blast cell can effectively have a wider width for increased storage and efficient loading/unloading.

As described herein, the blast cells 102, 902 can be configured in various suitable dimensions. For example, as illustrated in FIG. 11, an entire height H1 of the blast cell 902, a height H2 of the bay space 912, a height H3a, H3b, H3c of each level 914A, 914B, 914C, and a height H4 of the intake plenum 950 can be determined to meet design requirements and/or constraints, and also provide optimal results. In addition, as illustrated in FIG. 10, an entire width W1 of the blast cell 902, and a width W2a, W2b of each bay section 915A, 915B can be determined to meet design requirements and/or constraints, and also provide optimal results.

As illustrated in FIG. 11, the fan assembly 930 can be arranged to be raised from the surface of the channel wall 952 at a distance L4. In addition or alternatively, the fan assembly 930 can be arranged to abut with the top surface of the intake plenum 950. Other arrangements of the fan assembly 930 are also possible with respect to the channel wall 952. For example, the fan assembly 930 can be arranged to be seated on the surface of the channel wall 952 (e.g., the distance L4 is zero).

Figure 12:
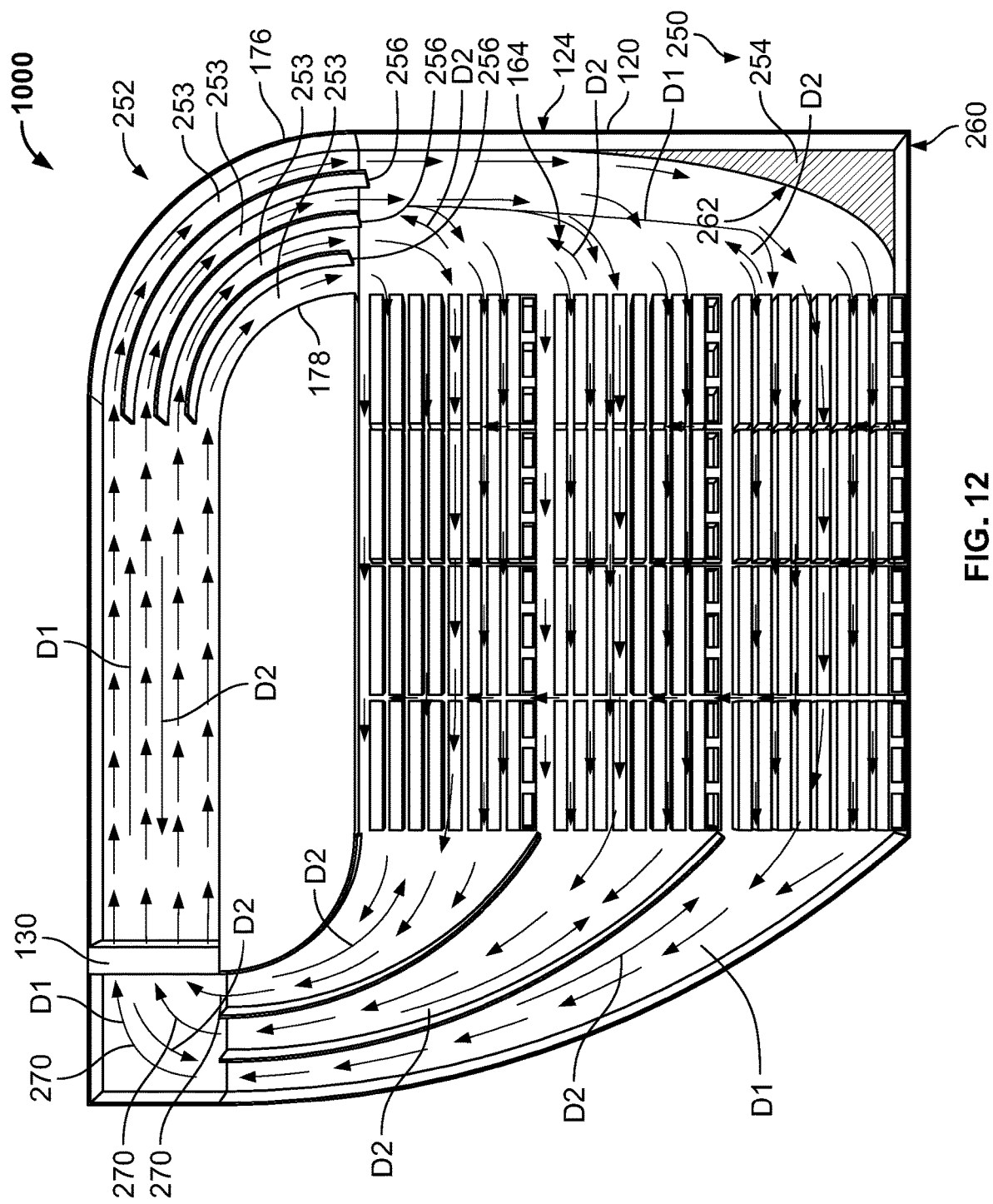
FIG. 12 illustrates an example blast cell capable of reverse airflow.
Figure 13:
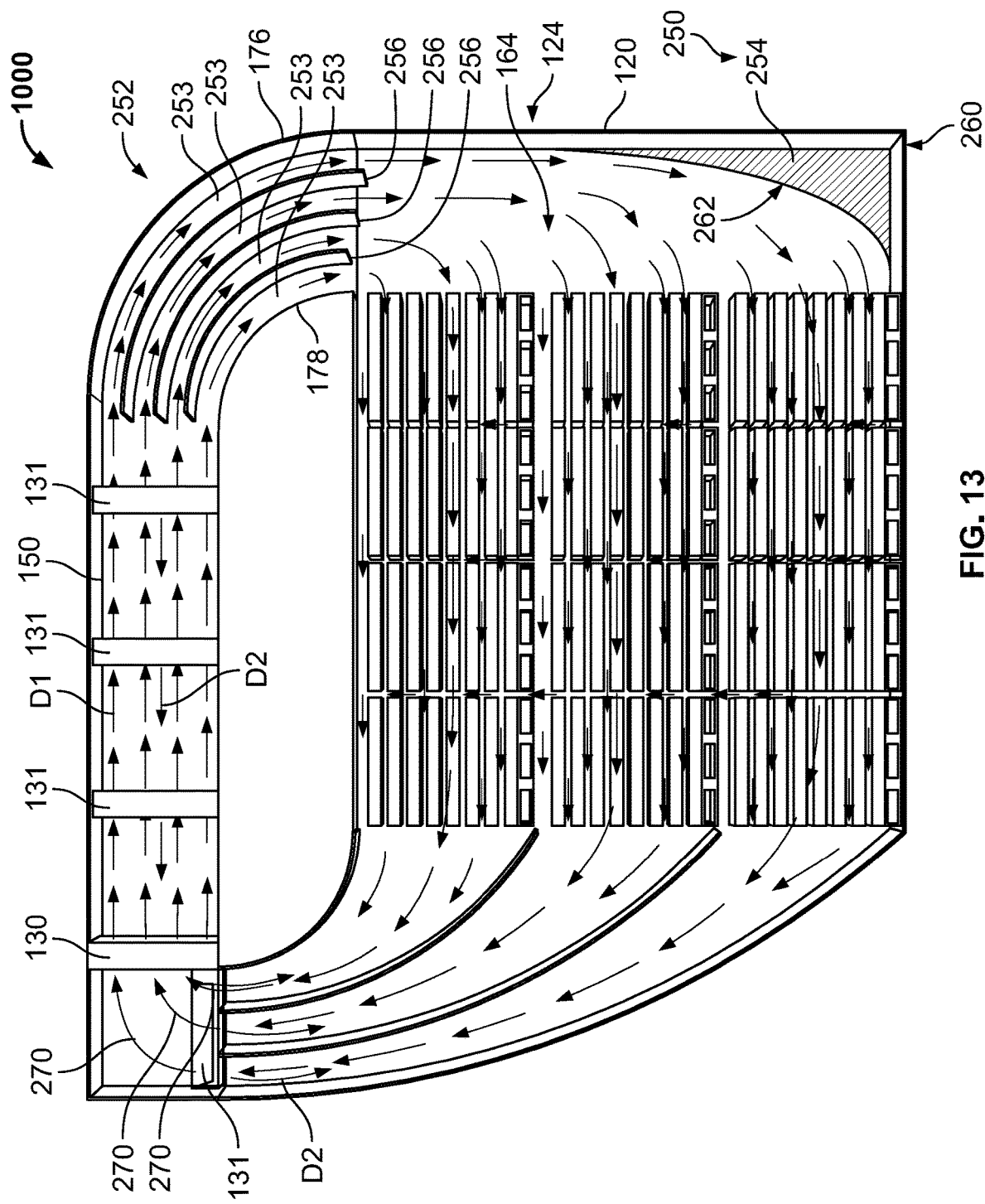
FIG. 13 illustrates another example blast cell capable of reverse airflow.
Figure 14:
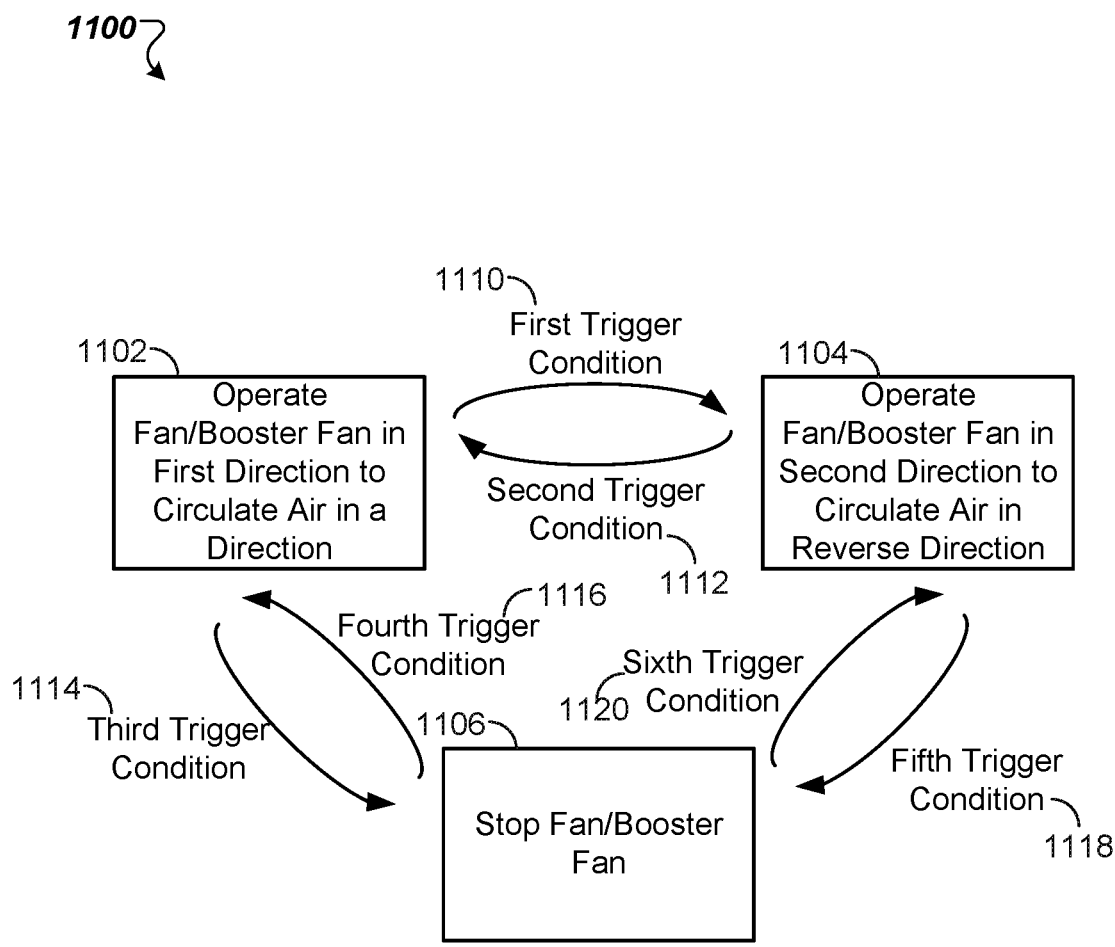
FIG. 14 illustrates an example blast cell cycle.

Referring now to FIGS. 12-14, an example blast cell system 1000 is described for flowing air in reverse. In general, the air can be supplied through the channels 141 into the bay space 112. Such a reverse air flow may be performed at different stages of a blast cycle, such as for a period of time in the middle of a blast cycle, near the end of a blast cycle, etc. For example, air is circulated in the direction (from the bay space 112 to the fan through the channels 141) described in FIGS. 1-7 and 10-11 for a majority of a blast cycle, and the air can be reversed near the end of the blast cycle. Other blast cycles are also possible using circulation of air in two opposite directions.

Reverse air flow can be implemented in a blast cell, such as the blast cell 250 in FIG. 6 or the blast cell 902 of FIG. 11. As illustrated in FIG. 12, the fan 130 of the blast cell 250 can be a reversible fan which can be controlled to blow air in a first direction D1 or in an opposite second direction D2.

In addition or alternatively, as illustrated in FIG. 13, the blast cell 250 can include one or more booster fans 131 configured to create air flow in the second direction D2. For example, where the fan 130 is not reversible, the booster fans 131 can be used to create airflow in a reverse direction while the fan 130 is turned off. Alternatively, where the fan 130 is reversible, the booster fans 131 can be used to augment a reverse airflow while the fan 130 blows the air in the reverse direction. The booster fans 131 can be arranged in various locations. For example, the booster fans 131 can be arranged at locations in the intake plenum 150. Other locations along an airflow in a blast cell are also possible. The booster fans 131 can be configured and sized to take up the entire cross section of the airflow path (e.g., the entire cross section of the intake plenum where the booster fans are located). Alternatively, the booster fans 131 can be configured and sized to be smaller than the cross section of the airflow path.

Referring to FIG. 14, an example blast cycle 1100 is described which can selectively generate airflow in either of two opposite directions. The blast cycle 1100 can include operation (e.g., a forward airflow operation 1102) of a fan and/or a booster fan (e.g., the fan 130, 930 and/or the booster fans 131) in a first rotational direction to circulate air in a direction (e.g., the first direction D1), operation (e.g., a reverse airflow operation 1104) of the fan and/or the booster fan in a second rotational direction (e.g., opposite to the first rotational direction) to circulate air in a reverse direction (e.g., the second direction D2), and stopping (e.g., a fan stop operation 1106) the fan and/or the booster fan.

A blast cycle 1100 can include one or more forward airflow operations 1102, one or more reverse airflow operations 1104, and one or more fan stop operations 1106. The number of each of the operations 1102, 1104, and 1106 can be determined as appropriate. In some implementations, the blast cycle 1100 can include no forward airflow operation 1102, no reverse airflow operation 1104, or no fan stop operation 1106 (except for ending the blast cycle). Further, one or more forward airflow operations 1102, one or more reverse airflow operations 1104, and one or more fan stop operations 1106 can be arranged in various sequences and with various durations.

In some implementations, a schedule for a blast cycle can include a reverse airflow operation for a predetermined period of time near the end of a blast cycle while the remaining blast cycle is operated with a forward airflow operation. In other implementations, one or more reverse airflow operations can be included intermittently throughout a blast cycle.

In some implementations, a schedule of when to forward airflow (the forward airflow operation 1102), when to reverse airflow (the reverse airflow operation 1104), and/or when to stop (the fan stop operation 1106) can be determined by detecting a heat transfer coefficient at each pallet position in the cell and running an optimization algorithm for minimizing the freeze time of the last freezing pallet. Alternatively or in addition, real-life experiments can be run with temperature probes in all pallet positions to determine an optimal airflow schedule. In addition or alternatively, a schedule can be determined by measuring temperatures (e.g., using temperature sensors) and calculating a temperature differential reading. The airflow can be forwarded and reversed based on when the temperature differential value hits certain threshold values.

The forward airflow operation 1102 can be switched to the reverse airflow operation 1104 when a first trigger condition 1110 occurs or is detected, and the reverse airflow operation 1104 can be switched to the forward airflow operation 1102 when a second trigger condition 1112 occurs or is detected. The forward airflow operation 1102 can be switched to the fan stop operation 1106 when a third trigger condition 1114 occurs or is detected, and the fan stop operation 1106 can be switched to the forward airflow operation 1102 when a fourth trigger condition 1116 occurs or is detected. The reverse airflow operation 1104 can be switched to the fan stop operation 1106 when a fifth trigger condition 1118 occurs or is detected, and the fan stop operation 1106 can be switched to the reverse airflow operation 1104 when a sixth trigger condition 1120 occurs or is detected. The trigger conditions 1110, 1112, 1114, 1116, 1118, and 1120 can be predetermined based on various factors associated with operations of blast cells, such as time, air temperature, pallet temperature, efficiency, etc. The third and fifth trigger conditions 1114 and 1118 can include the end of a blast cycle or the end of operation of a blast cell so that the fans and blast fans in a blast cell are stopped when they don't need to be operated.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A blast freezing system comprising:
   one or more blast cells, each configured to receive items and operate to cool the items received therein, each of the blast cells including:
      a housing defining (i) a bay space, (ii) a plenum, (iii) a first air passage fluidly connecting a first end of the bay space to a first end of the plenum, and (iv) a second air passage fluidly connecting a second end of the bay space to a second end of the plenum, wherein the bay space, the plenum, the first air passage, and the second air passage collectively provide a closed-loop within which air is circulated within the housing;
      a fan configured to circulate air through the bay space, the plenum, the first air passage, and the second air passage in the closed-loop provided by the bay space in the housing; and
      a plurality of channels arranged within at least a portion of the second air passage, each of the plurality of channels defining a fluid pathway that (i) is fluidly separate from other fluid pathways provided by others of the plurality of channels and (ii) extends from the second end of the bay space to the second end of the plenum, the plurality of channels configured to, over their length, turn a direction of airflow from the second end of the bay space to the second end of the plenum.

2. The blast freezing system of claim 1, wherein the one or more blast cells are configured to independently operate to cool the items received therein.

3. The blast freezing system of claim 1, wherein the one or more blast cells are arranged at a distance from one another.

4. The blast freezing system of claim 1, wherein the fan is positioned within the plenum.

5. The blast freezing system of claim 1, wherein each of the blast cells includes:
an air flow guide arranged at a corner of the housing and configured to streamline the air flow at the corner with reduced turbulence, and
wherein the air flow guide includes a plurality of turning vanes configured to provide curved air passages at the corner.

6. The blast freezing system of claim 1, wherein each of the blast cells includes:
a door configured to selectively open or close an entrance of the housing through which the items are moved into the bay space, the entrance including one or more surfaces that, at least in part, define the first air passage of the housing.

7. The blast freezing system of claim 1, wherein the one or more blast cells are arranged by side-by-side.

8. The blast freezing system of claim 7, wherein the one or more blast cells are split by one or more walls.

9. The blast freezing system of claim 1, wherein the fan is configured to selectively circulate air in a first direction and a second direction opposite to the first direction.

10. The blast freezing system of claim 9, wherein the fan is configured to circulate air in the first direction to (i) pull the air from the second end of the bay space, through the second air passage, and into the second end of the plenum, and (ii) discharge the air into the first end of the plenum, through the first air passage, and toward the first end of the bay space.

11. The blast freezing system of claim 10, wherein the fan is configured to circulate air in the second direction to (i) push the air from the rea end of the plenum, through the second air passage, and into the second end of the bay space, and (ii) draw the air from the first end of the bay space, through the first air passage, and into the first end of the plenum.

12. The blast freezing system of claim 1, wherein the bay space includes a plurality of rows, each of the plurality of rows configured to hold one or more pallets of items to be cooled, and
wherein the plurality of channels are arranged to correspond with the plurality of rows in the bay space, respectively.

13. The blast freezing system of claim 12, wherein the fluid pathway of each of the plurality of channels extends from a second end of a corresponding row of the plurality of rows to the second end of the plenum.

14. The blast freezing system of claim 12, wherein the plurality of channels each has a width that gradually becomes smaller from a drawing end adjacent the second end of the bay space to an opposite discharging end adjacent the second end of the plenum.

15. The blast freezing system of claim 12, wherein the plurality of channels each has a drawing end adjacent the second end of the bay space and a discharging end adjacent the second end of the plenum, the discharging end having a narrower width than the drawing end.

16. The blast freezing system of claim 15, wherein the plurality of channels includes one or more walls curved between the drawing end and the discharging end.

17. A method for blast-freezing items, the method comprising:
providing a plurality of blast cells including a first blast cell and a second blast cell, each of the plurality of blast cells configured to receive items and operate to cool the items received therein, each of the plurality of blast cells including a housing defining (i) a bay space, (ii) a plenum, (iii) a first air passage fluidly connecting a first end of the bay space to a first end of the plenum, and (iv) a second air passage fluidly connecting a second end of the bay space to a second end of the plenum, wherein the bay space, the plenum, the first air passage, and the second air passage collectively provide a closed-loop within which air is circulated within the housing;
circulating, using one or more fans, first air through the bay space, the plenum, the first air passage, and the second air passage in the closed-loop provided by the bay space in the first blast cell; and
circulating, using the one or more fans, second air through the bay space, the plenum, the first air passage, and the second air passage in the closed-loop provided by the bay space in the second blast cell,
wherein the one or more fans include a first fan arranged in the first blast cell and a second fan arranged in the second blast cell.

18. The method of claim 17, wherein circulating the first air in the first blast cell is performed independently from circulating the second air in the second blast cell.

19. The method of claim 17,
wherein circulating the first air in the first blast cell includes operating the first fan at a first fan speed, and
wherein circulating the second air in the second blast cell includes operating the second fan at a second fan speed being different from the first fan speed.

20. The method of claim 17,
wherein circulating the first air in the first blast cell includes operating the first fan in a first operational mode, and
wherein circulating the second air in the second blast cell includes operating the second fan in a second operational mode being different from the first operational mode.

21. The method of claim 17,
wherein circulating the first air in the first blast cell includes operating the first fan based on a first blast cycle schedule, and
wherein circulating the second air in the second blast cell includes operating the second fan based on a second blast cycle schedule being different from the first blast cycle schedule.

22. A method for blast-freezing items, the method comprising:
providing a plurality of blast cells including a first blast cell and a second blast cell, each of the plurality of blast cells configured to receive items and operate to cool the items received therein, each of the plurality of blast cells including a housing defining (i) a bay space, (ii) a plenum, (iii) a first air passage fluidly connecting a first end of the bay space to a first end of the plenum, and (iv) a second air passage fluidly connecting a second end of the bay space to a second end of the plenum, wherein the bay space, the plenum, the first air passage, and the second air passage collectively provide a closed-loop within which air is circulated within the housing;
circulating, using one or more fans, first air through the bay space, the plenum, the first air passage, and the second air passage in the closed-loop provided by the bay space in the first blast cell; and
circulating, using the one or more fans, second air through the bay space, the plenum, the first air passage, and the second air passage in the closed-loop provided by the bay space in the second blast cell, wherein the bay space includes a plurality of rows, each of the plurality of rows configured to hold one or more pallets of items to be cooled, and wherein circulating the first air in the first blast cell includes:

circulating, using the one or more fans, the first air through fluid pathways defined by a plurality of channels in the first blast cell, the plurality of channels arranged within the second air passage and being in fluid communication with the plurality of rows, respectively, each of the plurality of channels defining a fluid pathway that (i) is fluidly separate from other fluid pathways provided by others of the plurality of channels and (ii) extends from a second end of a corresponding row of the plurality of rows to the second end of the plenum, the plurality of channels configured to, over their length, turn a direction of airflow from the second end of the bay space to the second end of the plenum.

23. The method of claim 22, wherein circulating the second air in the second blast cell includes:

circulating, using the one or more fans, the second air through fluid pathways defined by a plurality of channels in the second blast cell, the plurality of channels arranged within the second air passage and being in fluid communication with the plurality of rows, respectively, each of the plurality of channels defining a fluid pathway that (i) is fluidly separate from other fluid pathways provided by others of the plurality of channels and (ii) extends from a second end of a corresponding row of the plurality of rows to the second end of the plenum, the plurality of channels configured to, over their length, turn a direction of airflow from the second end of the bay space to the second end of the plenum.

* * * * *